US012402753B2

(12) United States Patent
Underwood et al.

(10) Patent No.: US 12,402,753 B2
(45) Date of Patent: Sep. 2, 2025

(54) PADDLE-OPERATED PANINI PRESS WITHIN AN OVEN CAVITY

(71) Applicant: WELBILT UK LIMITED, Newcastle-upon-Tyne (GB)

(72) Inventors: Matthew David Underwood, England (GB); Adam Sajjad, Slough (GB)

(73) Assignee: WELBILT UK LIMITED, Newcastle-upon-Tyne (GB)

( * ) Notice: Subject to any disclaimer, the term of this patent is extended or adjusted under 35 U.S.C. 154(b) by 714 days.

(21) Appl. No.: 17/740,452

(22) Filed: May 10, 2022

(65) Prior Publication Data

US 2022/0361712 A1     Nov. 17, 2022

Related U.S. Application Data

(60) Provisional application No. 63/187,053, filed on May 11, 2021.

(51) Int. Cl.
*A47J 37/06* (2006.01)
*A23L 5/00* (2016.01)
*A23L 5/10* (2016.01)

(52) U.S. Cl.
CPC .............. *A47J 37/0611* (2013.01); *A23L 5/15* (2016.08); *A23L 5/00* (2016.08); *A47J 2037/0617* (2013.01)

(58) Field of Classification Search
CPC .................... A47J 37/06; A47J 36/0611; A47J 2037/0617; A23L 5/00; A23L 5/10; A23L 5/15

(Continued)

(56) References Cited

U.S. PATENT DOCUMENTS 5,586,488 A * 12/1996 Liu ...................... A47J 37/0658
                                                        219/400
6,205,914 B1 * 3/2001 McCarney ........... A21C 11/006
                                                        99/376
(Continued)

FOREIGN PATENT DOCUMENTS

EP           3693669 A1    8/2020

OTHER PUBLICATIONS

International Search Report dated Oct. 12, 2022 for PCT Appl. No. PCT/IB2022/000268.

(Continued)

*Primary Examiner* — Reginald Alexander
(74) *Attorney, Agent, or Firm* — Ohlandt, Greeley and Perle, L.L.P.

(57) ABSTRACT

A grilling apparatus for use in a cooking chamber of an oven, wherein the apparatus comprises: a panini press which comprises: an upper grill comprising a pair of oppositely disposed downwardly facing first guide rails; a lower grill comprising a pair of oppositely disposed upwardly facing guide surfaces; wherein the upper grill is reciprocally movable in a vertical direction towards and away from the lower grill by a pair of oppositely disposed alignment devices connected to opposing sides of the upper grill and disposed within a respective pair of upwardly facing guide surfaces connected to lower grill; and a paddle for holding at least one food product, which paddle comprises: a base portion, and a pair of oppositely disposed upward facing second guide rails which align with their respective the first guide rails, such that when the paddle enters the cooking chamber the second guide rails contact their respective the first guide rails which causes the upper grill to move upwardly away from the lower grill, thereby allowing the food product to be disposed between a lower surface of the upper grill and an upper surface of the lower grill; wherein upon removal of the (Continued)

paddle, the upper grill moves toward the food product and applies sufficient pressure to condense and impress grill marks on the food product during a cooking process.

12 Claims, 31 Drawing Sheets

(58) Field of Classification Search
USPC .......... 99/349, 351, 353, 379; 426/496, 520, 426/523; 100/266, 267
See application file for complete search history.

(56) References Cited

U.S. PATENT DOCUMENTS

| | | | |
|---|---|---|---|
| 2009/0107343 A1 | 4/2009 | De Longhi | |
| 2009/0178574 A1* | 7/2009 | Martinez | A47J 37/0611 99/349 |
| 2014/0010937 A1* | 1/2014 | Stanger | A47J 39/003 426/520 |
| 2015/0272387 A1 | 10/2015 | Stanger | |

OTHER PUBLICATIONS

Written Opinion dated Oct. 12, 2022 for PCT Appl. No. PCT/IB2022/000268.

* cited by examiner

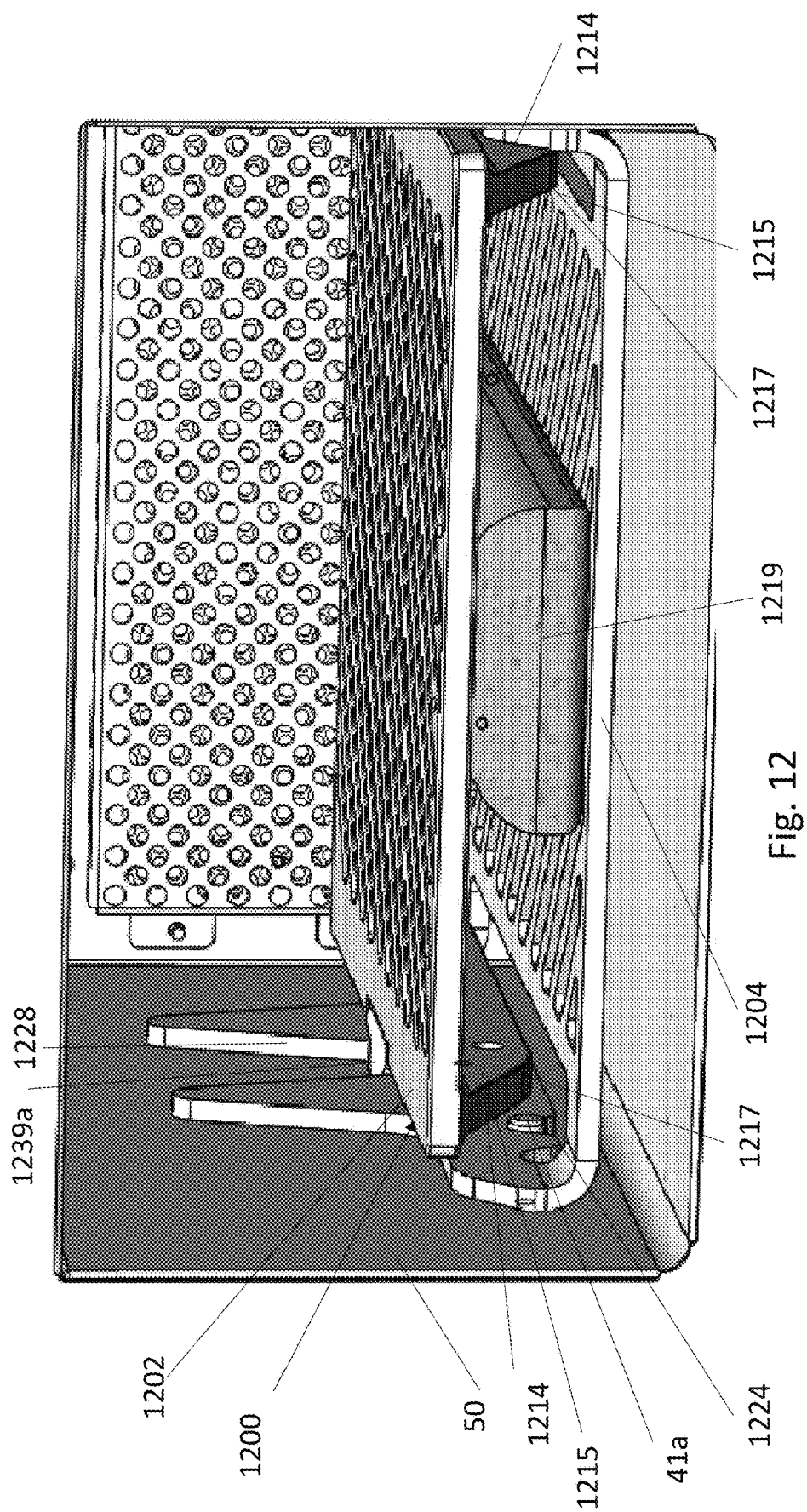

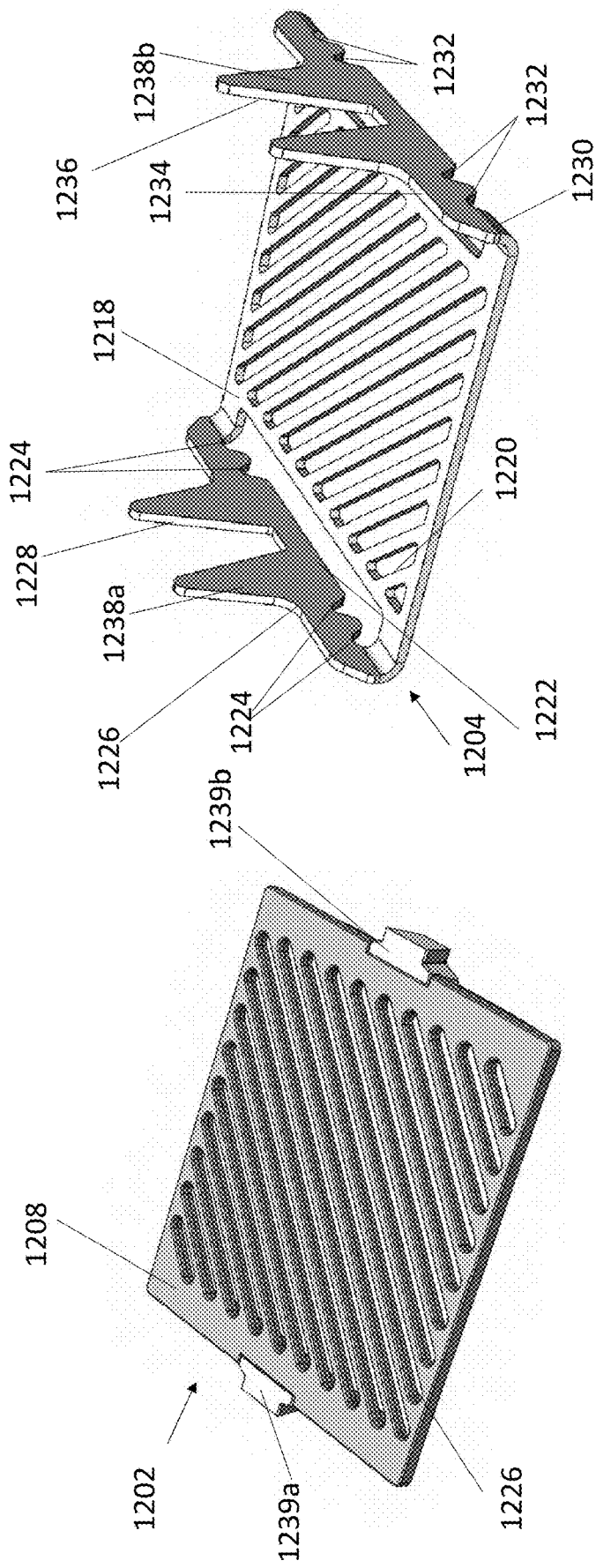

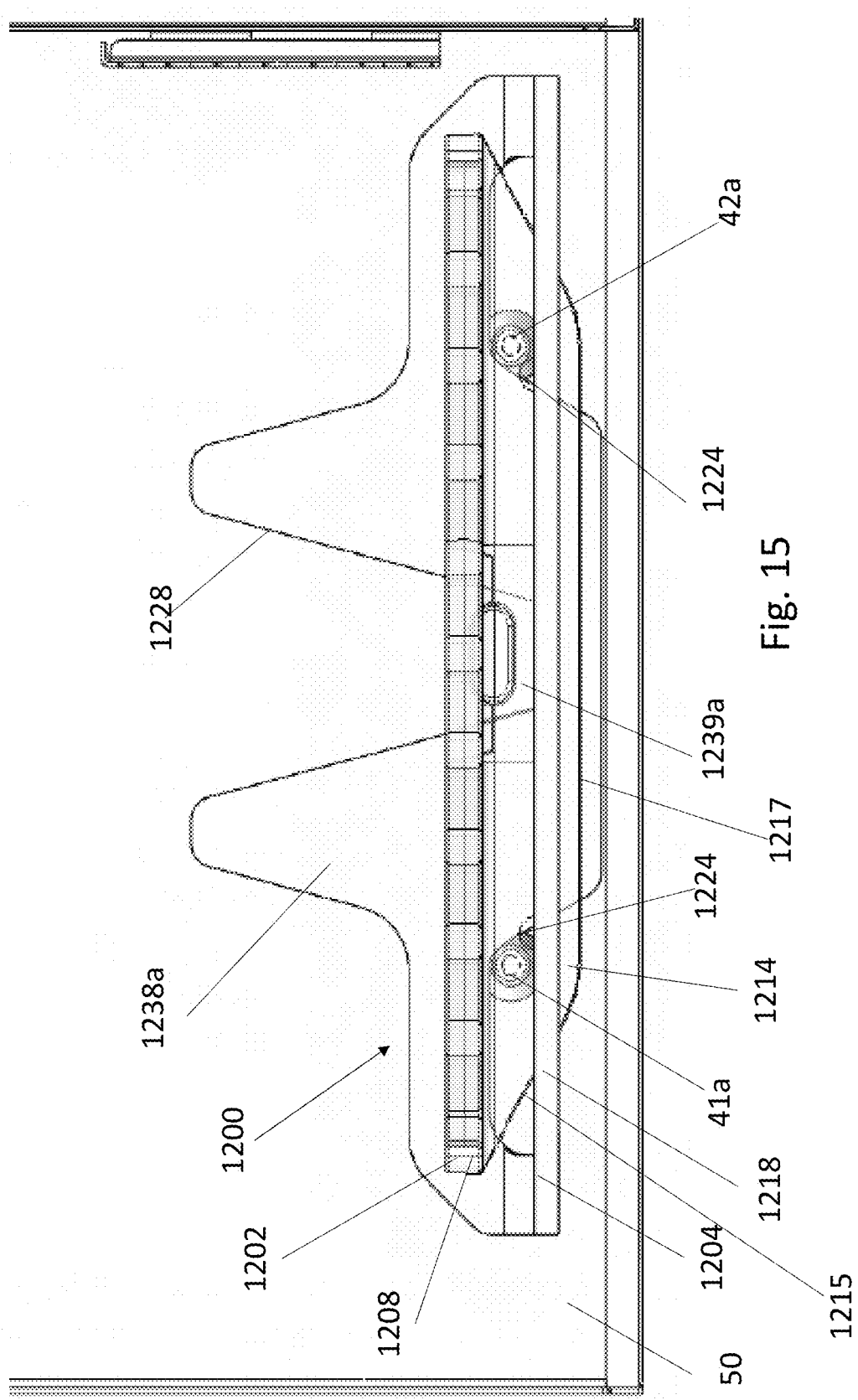

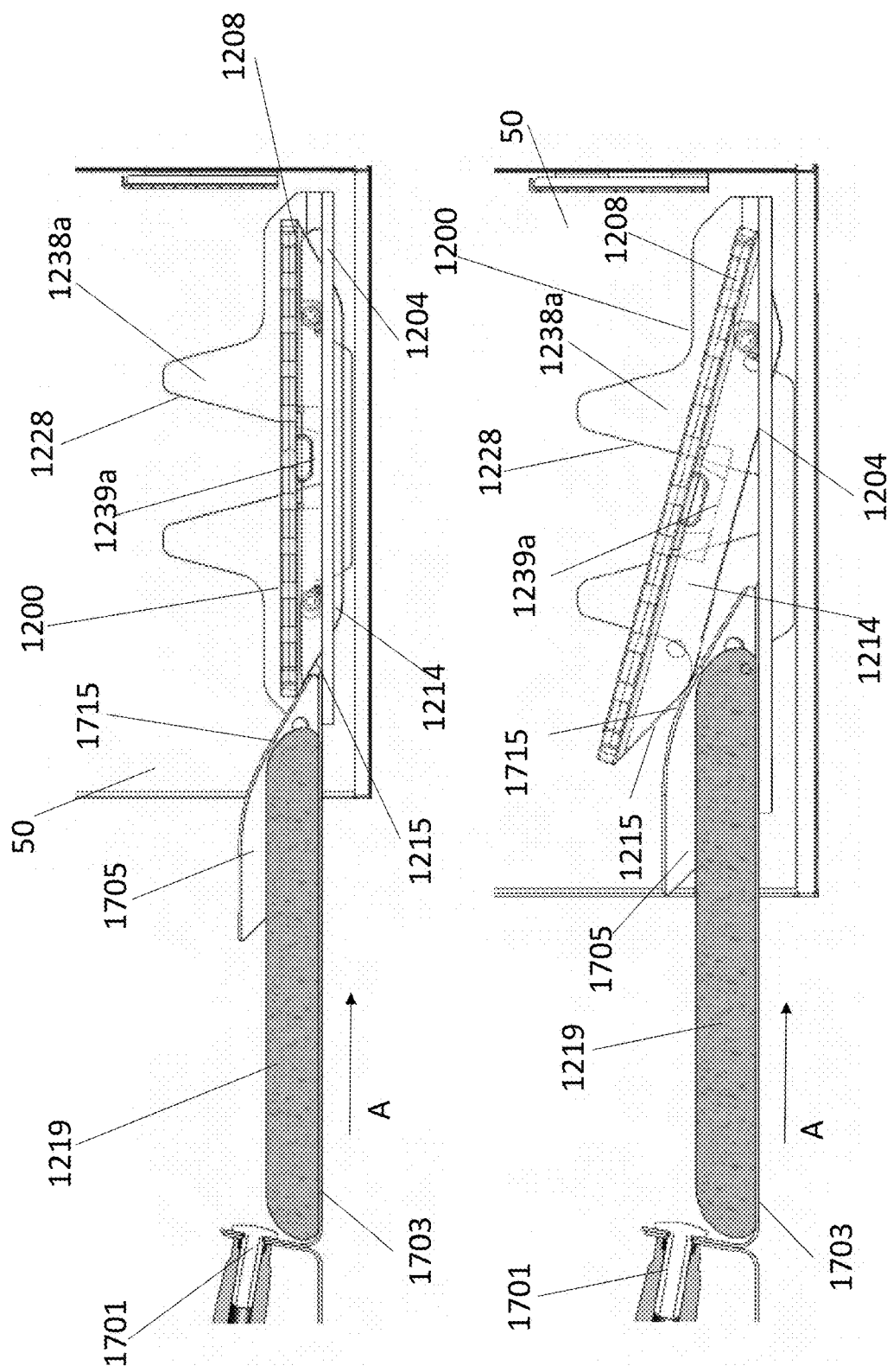

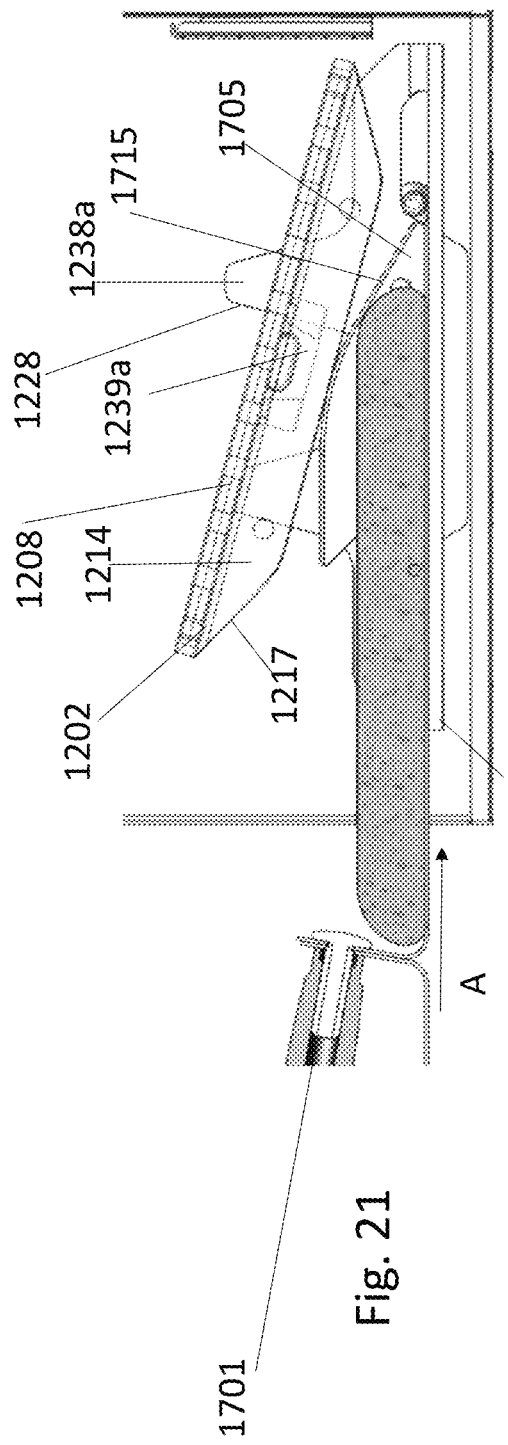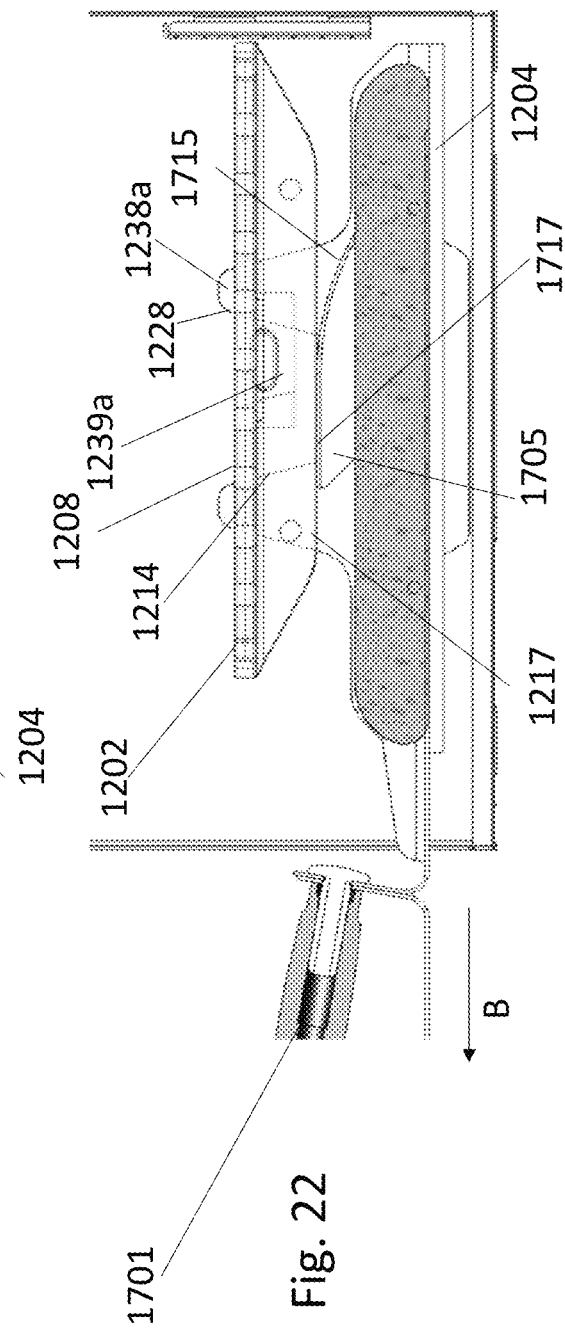

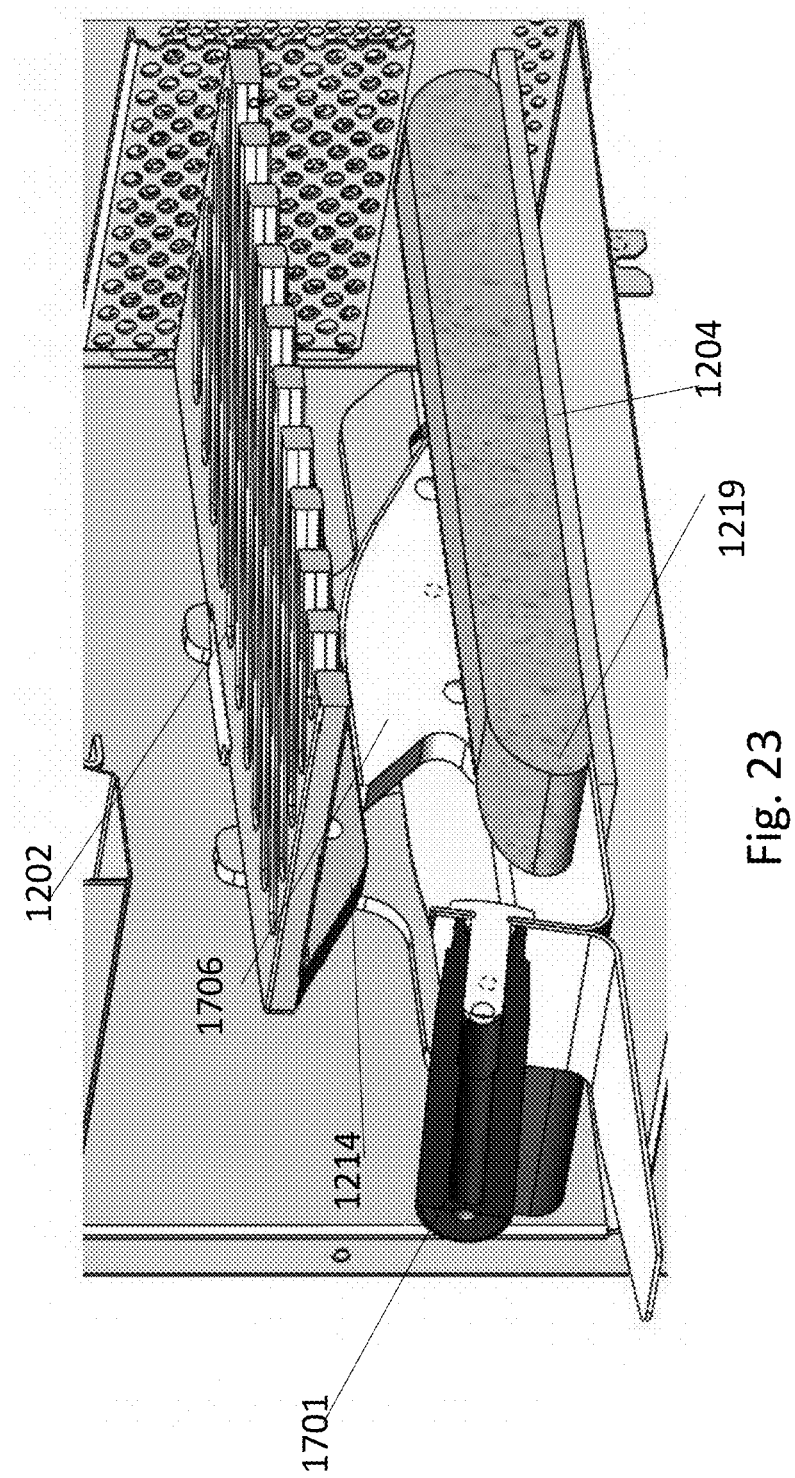

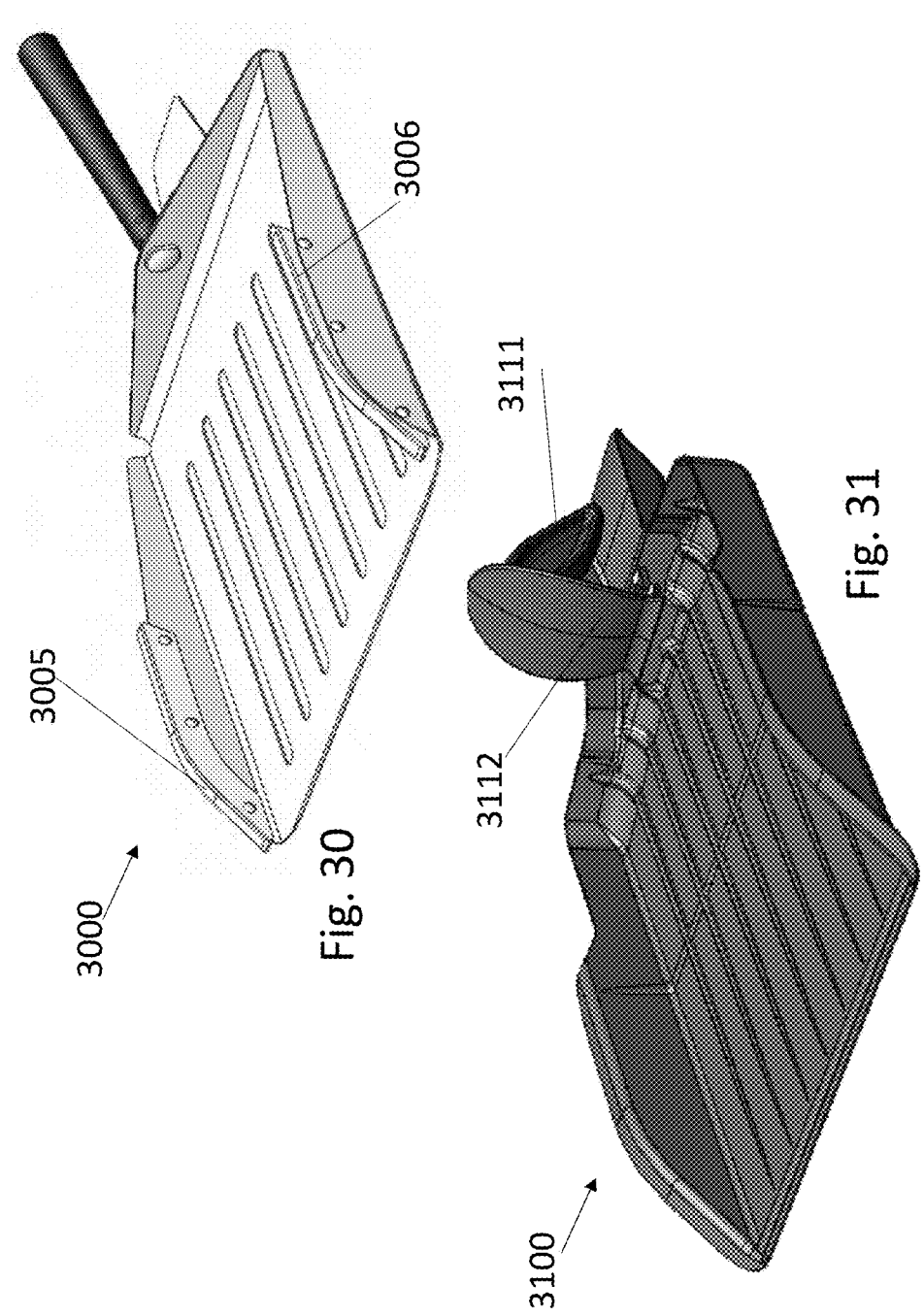

PADDLE-OPERATED PANINI PRESS WITHIN AN OVEN CAVITY

CROSS REFERENCE TO RELATED APPLICATIONS

This application claims the benefit of U.S. Provisional Application 63/187,053 filed May 11, 2021, the contents of which are incorporated by reference herein.

BACKGROUND

1. Field of the Disclosure

The present disclosure generally relates to a device (i.e., panini press) that produces a grilled/toasted product in an oven. More particularly, the device includes substantially vertically reciprocating upper grill, which can be lifted away from a stationary lower grill by a panini paddle such that food product(s) disposed on the base of the paddle can be inserted between the upper and lower grills, thereby allowing opposite surfaces of the food product(s) to receive grilled/toasted markings. The paddle is configured to mechanically lift the upper grill away from the lower grill to allow the deposition of the food product(s) therebetween without any resultant damage to the food product(s) during insertion.

2. Discussion of the Background Art

Typically, panini sandwiches are cooked by means of a conventional panini press, not in an oven. Others have tried to make panini sandwiches in an oven with varying degrees success. In one such oven device, an operator will place a food product on a grated surface in an oven to cook a first side and then manually flip the food product over to cook the second side. This process is very slow and requires additional operator intervention, as well as being potentially hazardous to the operator as they insert their arm into the oven to turn over the food product.

Still others have developed complex two-sided grilling devices to overcome the aforementioned disadvantages and allows for faster cooking by grilling on both sides simultaneously. In addition, easy disassembly allows for easy cleaning without necessity of any tools. One such two-sided grilling device is shown in US Patent Publication No. 2015-0272387, dated Oct. 1, 2015, which is incorporated herein by reference thereto in its entirety and includes a grilling apparatus for use in a cooking chamber of an oven includes an upper cooking surface, a lower cooking surface, at least one pair of connectors movably connecting the upper cooking surface to the lower cooking surface, a guide disposed about a door of the oven, and an actuator connected to the pair of connectors. The actuator is slidably disposed about the guide. The guide is connected to the door of the oven such that movement of the door causes the actuator to slide in the guide moving the upper and lower cooking surfaces towards and/or away from one another.

The problem with this device is that it requires too many moving and connecting parts, as well as a guide that is connected to the door of the oven. Such a guide and connecting parts are cumbersome and require removal from the door before cleaning and maintenance. There is significant time, cost and disruption associated with this complex construction especially considering that an oven needs to be converted by a service agent as opposed to being fitted by the customer. Maintenance is also expensive due to wearing parts being complex and expensive assemblies as opposed to simple low-cost modular customer replaceable components.

SUMMARY

The present disclosure provides a simple three (3) piece design comprising a lower grill, upper grill and paddle that is very space efficient, and which maintains the existing versatility of the oven when not used to 'press' the food product between the upper and lower grills. The simple design enables easier cleaning and less ingress into the areas critical to mechanical operation. The benefits of the present disclosure are the single handed operation, speed, efficiencies, safety, and comfort when using a panini press within an oven cavity. The present disclosure uses a lower grill that guides the novel paddle into position for safe and reliable operation. The paddle has extra features that engage with the upper grill creating a lifting force between the lower grill and upper grill. These profiles are optimized in form and material to create a smooth, safe, and reliable operation (i.e., entry/lift, exit/press/removal). The lower grill has features that interface with the upper grill to guide the operation of the upper grill for safety, ease, and reliability. These are designed to allow users ease of assembly and disassembly with low-cost modular components being customer replaceable. The present disclosure provides many advantages due to its simplicity, fewer mechanical connecting parts and lack of a guide connecting to the front door, which shall become apparent as described below.

A grilling apparatus for use in a cooking chamber of an oven, wherein the apparatus comprises: a panini press which comprises: an upper grill comprising a pair of oppositely disposed downwardly facing first guide rails; a lower grill comprising a pair of oppositely disposed upwardly facing guide surfaces; wherein the upper grill is reciprocally movable in a substantially vertical direction towards and away from the lower grill by a pair of oppositely disposed alignment devices connected to opposing sides of the upper grill and disposed within a respective pair of upwardly facing guide surfaces connected to lower grill; and a paddle for holding at least one food product, which paddle comprises: a base portion, and a pair of oppositely disposed upward facing second guide rails which align with their respective the first guide rails, such that when the paddle enters the cooking chamber the second guide rails contact their respective the first guide rails which causes the upper grill to move upwardly away from the lower grill, thereby allowing the food product to be disposed between a lower surface of the upper grill and an upper surface of the lower grill; wherein upon removal of the paddle, the upper grill moves toward the food product and applies sufficient pressure to condense and impress grill marks on the food product during a cooking process.

The grilling apparatus wherein the upper and lower grills comprise bars or slot therein, thereby leaving grill marks on both the upper and lower surfaces of the food product during the cooking process.

Further a grilling apparatus, wherein the upper grill comprises bars or slots therein and the lower grill comprises a base portion without any bars or slots, thereby enabling grill marks only on the upper surface of the food product.

The grilling apparatus, wherein the second guide rails are oblong and tapered at the front portions thereof, and the first guide rails are oblong and tapered at the portions facing the front portions of the second guide rails, thereby allowing the upwardly facing second guide rails from the paddle to wedge underneath the downward facing first guide rails of the upper grill, thereby lifting the upper grill, and moving it away from the lower grill.

The grill marks on both upper and lower grills have a perpendicular relationship for improved culinary performance. They are orientated diagonally from the direction of food entry for optimized culinary performance and operation ease. The mass of the upper grill is important to achieve culinary performance.

A method for cooking a food product in a cooking chamber of an oven which comprises: operating a panini press in the cooking chamber, wherein the panini press comprises: an upper grill comprising a pair of oppositely disposed downwardly facing first guide rails; a lower grill comprising a pair of oppositely disposed upwardly facing guide surfaces; wherein the upper grill is reciprocally movable in a substantially vertical direction towards and away from the lower grill by a pair of oppositely disposed alignment devices connected to opposing sides of the upper grill and disposed within a respective pair of upwardly facing guide surfaces connected to lower grill; delivering at least one food product into the cooking chamber via a paddle which comprises: a base portion, and a pair of oppositely disposed upward facing second guide rails which align with their respective the first guide rails, such that when the paddle enters the cooking chamber the second guide rails contact their respective the first guide rails which causes the upper grill to move upwardly away from the lower grill, thereby allowing the food product to be disposed between a lower surface of the upper grill and an upper surface of the lower grill; and removing the paddle from the cooking chamber, thereby causing the upper grill to move towards the food product, such that the lower surface of the upper grill contacts the food product and applies sufficient pressure to condense and impress grill marks on the food product, as well as to increase heat transfer so as to reduce cooking time during a cooking process.

Additionally, the configuration and design of the panini press of the present disclosure utilizes materials and form to achieve an isolated design for optimal microwave arcing protection.

There are a number of techniques that can be used to remove the food product from the paddle into the oven, e.g., momentum, oscillation, clamping, and manual. Momentum is provided by inserting the paddle at a speed sufficient to create momentum, such that upon retraction of the paddle from the oven, then food product offloads from the paddling onto the lower grill. Oscillation is provided by inserting the paddle into the oven and using a shaking motion to offload the food product onto the lower grill. With larger food products clamping is provided by inserting the paddle and food product into the oven and at a certain depth the food product will interfere with the underside surface of the angled upper grill causing clamping of the food product. This can also be achieved with a slight raising of the paddle on exit with smaller food product to cause the similar clamping effect. Finally, manual removable is caused by insertion of the paddle into the oven (not quite fully) and as the paddle is retracted the free hand is used to maintain the food product's position and dislodge the contact between the paddle and the food product. The final offloading can be done using the paddle to push the food product into its final position. Alternatively, a rear section of the upper grill can be configured to include a clamp which clamps the food product when it is inserted far enough and the product is tall enough or stable enough, so that the food product remains on the lower grill after removal of the paddle.

Further objects, features and advantages of the present disclosure will be understood by reference to the following drawings, detailed description, and appended claims.

BRIEF DESCRIPTION OF THE DRAWINGS

FIGS. 1a-c provide an overview perspective of the key components of the two-sided grilling apparatus according to one embodiment of the present disclosure, wherein FIG. 1a is a front right side perspective view of the panini paddle; FIG. 1b is a right side sectioned perspective view of the paddle inserting the food product between the upper and lower grills disposed within an oven chamber; and FIG. 1c is a front perspective view of the food product being compressed by the upper grill descending toward the lower grill during the cooking process;

FIGS. 5a and b are a right-side cross-section views of two different configurations of the device, both showing the panini paddle with a food product disposed thereon and being inserted into an oven containing the two-sided panini press of FIG. 3 in the collapsed or closed position, wherein FIG. 5a shows the grill bars running front-to-back within the oven and FIG. 5b show the grill bars running diagonally within the oven;

FIGS. 9a-b are right side cross-section views, respectively, with the panini paddle removed and the upper grill in contact with the upper surface of the food product, wherein FIG. 9a shows the grill bars running front-to-back within the oven and FIG. 9b show the grill bars running diagonally within the oven;

FIGS. 10a-b are right side cross-sectional views, respectively, depicting the upper grill compressing the food product, wherein FIG. 10a shows the grill bars running front-to-back within the oven and FIG. 10b show the grill bars running diagonally within the oven;

FIG. 12 is a partial front perspective view of a two-sided grilling apparatus according to another embodiment of the present disclosure;

FIG. 13 is a top perspective view of an upper grill of the two-sided grilling apparatus of FIG. 12;

FIG. 14 is a top perspective view of a lower grill of the two-sided grilling apparatus of FIG. 12;

FIG. 15 is a partial right side cross-sectional view of the two-sided grilling apparatus of FIG. 12 wherein the downward facing guide rail of upper grill is shown as translucent;

FIG. 18 is a right-side cross-section view of the panini paddle with a food product disposed thereon and being inserted into an oven containing the two-sided panini press of FIG. 12 in the collapsed or closed position;

FIG. 19 is right side cross-sectional view of the panini paddle lifting the upper grill of the panini device according to FIG. 12 within the oven;

FIG. 21 is a right side cross-section view of the panini paddle lifting the upper grill of the panini device according to FIG. 12 within the oven;

FIG. 22 is a right side cross-section view of the panini paddle that has lifted the upper grill of the panini device according to FIG. 12 to an opened position and is within the oven to position the product under the upper grill;

FIG. 23 is a right side perspective cross-sectional view of the panini paddle that has lifted the upper grill of the panini device according to FIG. 12 to the opened position within the oven and positioned the product under the upper grill;

FIGS. 25-26 are right side cross-section views, respectively, with the panini paddle removed and the upper grill in contact with the upper surface of the food product, wherein FIG. 25 shows the upper grill on the upper surface of the food product and FIG. 26 shows the upper grill applying a pressure on the upper surface of the food product to compress the food product;

FIGS. 30 and 31 are right side perspective views of panini paddles that are modified from the panini paddle of FIG. 17.

DETAILED DESCRIPTION OF THE PREFERRED EMBODIMENT

Grilling food on both sides at once speeds up the cooking process and provides desirable grill marking similar to an open char broiler. In this disclosure cooking grids or grills are linked together to open and close by insertion of a novel panini paddle having a pair of guide rails grill lifters or guide rails directed upwards from the base of the panini paddle, which are designed to slide under and lift upwards a pair of oppositely tapered oblong guide rails protruding downward from the underside of an upper grill. These oppositely disposed guide rails allow for the panini paddle to insert at least one food product between the upper and lower grills without contacting the adjacent surfaces thereof with the food product until the panini paddle is removed from the oven.

Figures 1A, 1B:
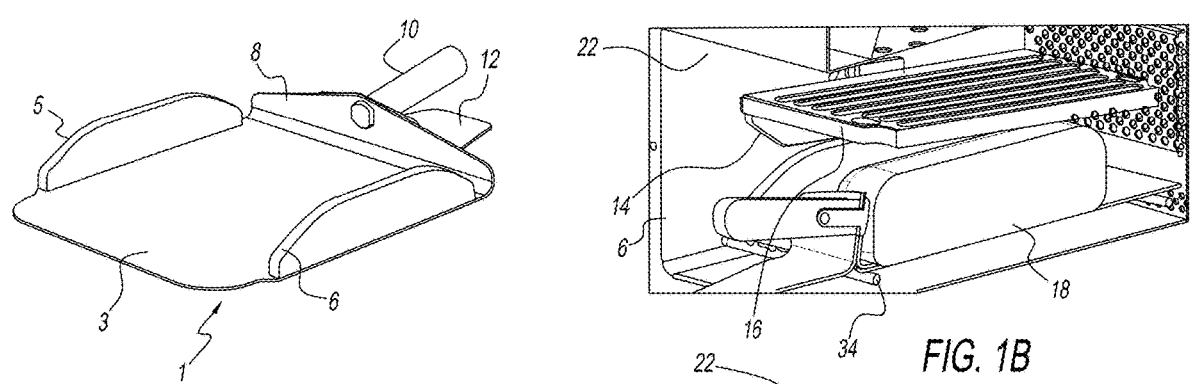
Figure 1C:
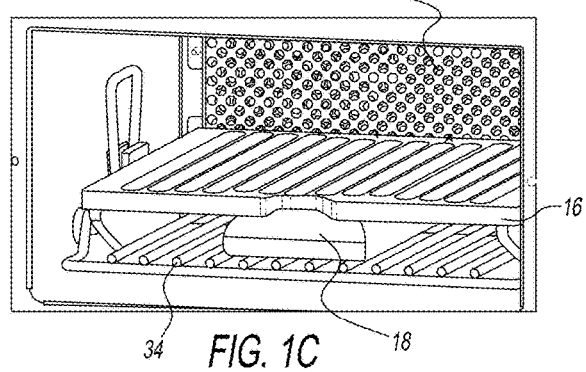

The present disclosure can best be described by referring to the figures, wherein FIGS. 1a-c and FIG. 2 depicts a panini paddle 1 having a base portion 3 and a pair of oppositely disposed side walls 7 having guide rails 5, 6 positioned perpendicular to base portion 3. In addition, a rear wall 8 is positioned upwards from base portion 3, with a handle 10 and handle shield 12 attached thereto. As shown in the cross section of FIG. 1b, oppositely disposed lifter or guide rail 6 together with unshown lifter or guide rail 5 comes into contact with downwardly disposed guide rail 14, which enable panini paddle 1 to lift upper grill 16 so that food product 18 disposed on base portion 3 may be slid between upper grill 16 and lower grill 34. FIG. 1c depicts the downward movement of upper grill 16 upon removal of panini paddle 1 from oven chamber 22, such that food product 18 is in contact with the lower surface of upper grill 16 and upper surface of lower grill 34.

Figure 1D:
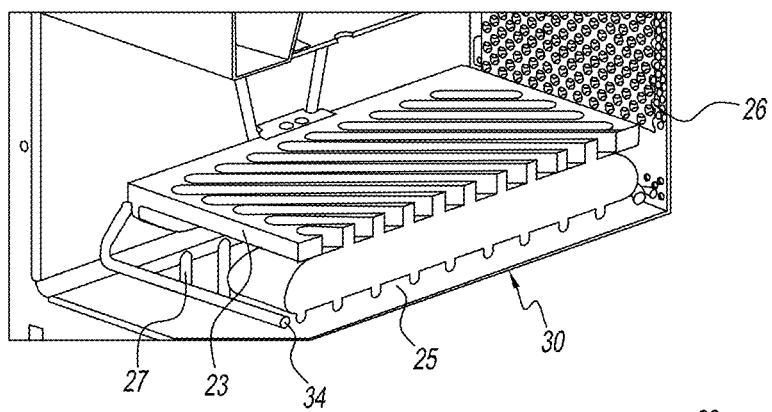
FIG. 1d depicts a different design of the upper and lower grills, wherein the grill slots and/or bars of the upper and lower grills are diagonal and oriented approximately 90 degrees from one another according to another embodiment of the present disclosure.
Figure 1E:
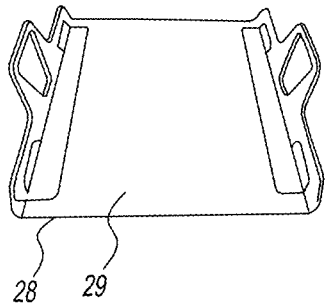
FIG. 1e is another embodiment of the lower grill according to the present disclosure having a flat, solid center portion.
Figure 1F:
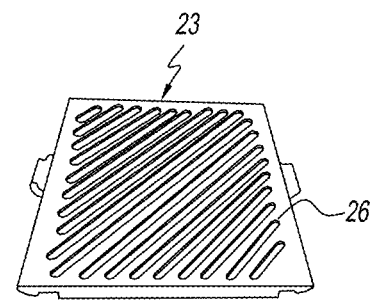
FIG. 1f depicts another embodiment of the upper grill with diagonal shaped grill slots and/or bars as shown in FIG. 1d.
Figure 2:
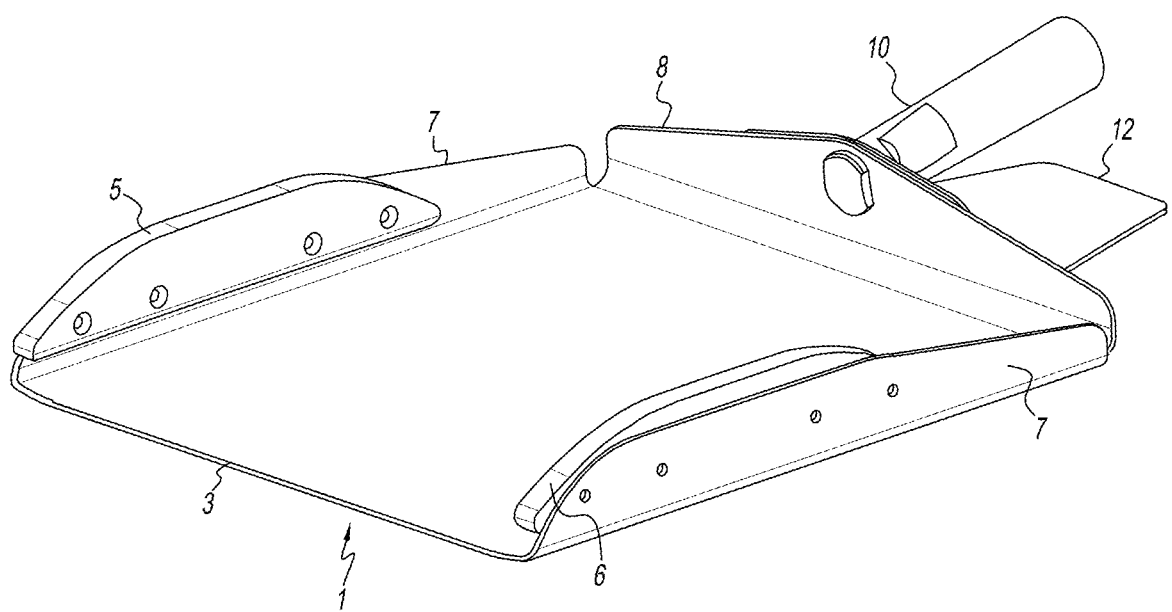
FIG. 2 is an enlarged front-right side perspective view of the panini paddle.

FIGS. 1d, 1e and 1f depict alternative embodiments of the panini press. For example, FIG. 1d depicts upper grill 23 having a diagonally angled bars or slots 26 and lower grill 34 having oppositely positioned diagonally angled bars or slots 27 which are, for example, 90 degrees opposite to bars or slots 26 of upper grill 23. FIG. 1e depicts still another embodiment, wherein lower grill 28 has a solid base portion 29, as opposed to bars or slots as shown in FIG. 1d. FIG. 1f depicts upper grill 23 with diagonally disposed bars or slots 26.

Figure 3:
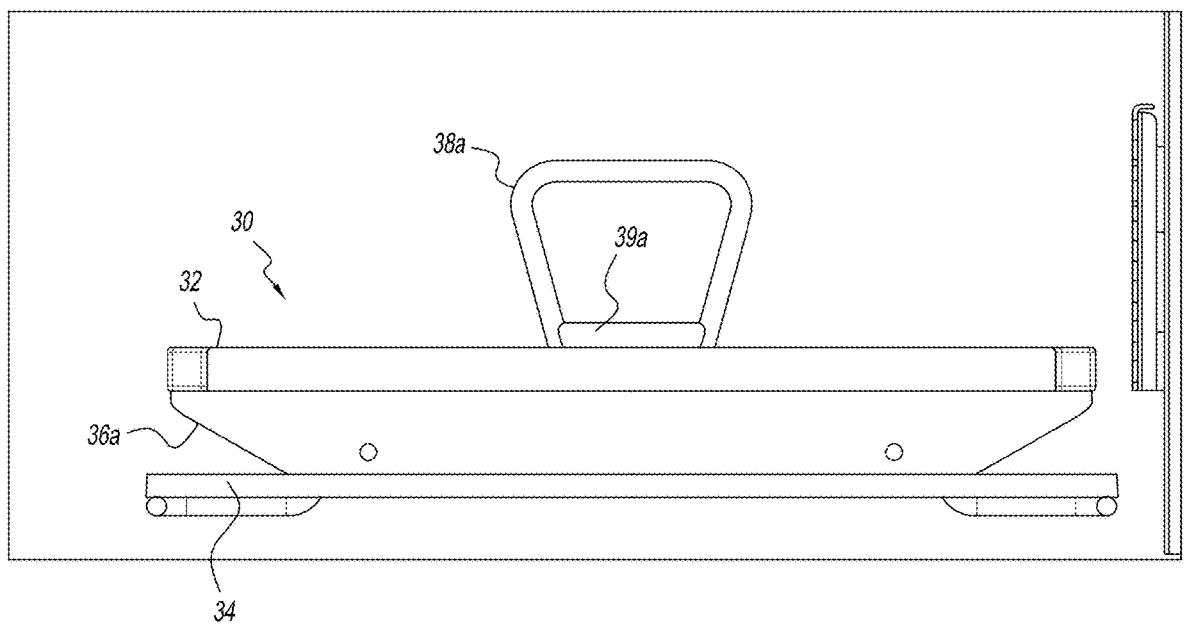
FIG. 3 is a right side cross-sectional view of the panini device having the upper and lower grills in the closed or collapsed position and the grill bars are positioned front-to-back within the oven.

FIG. 3 is a right side cross-sectional view of the panini device 30 having upper grill 32 comprising guide rail 36a facing downwards towards lower grill 34 in the closed or collapsed position. Fixedly attached to upper grill is alignment device 39a which is movable disposed within alignment surface 38a which is connected to lower grill (numbered as both 24 and 34).

Figure 4:
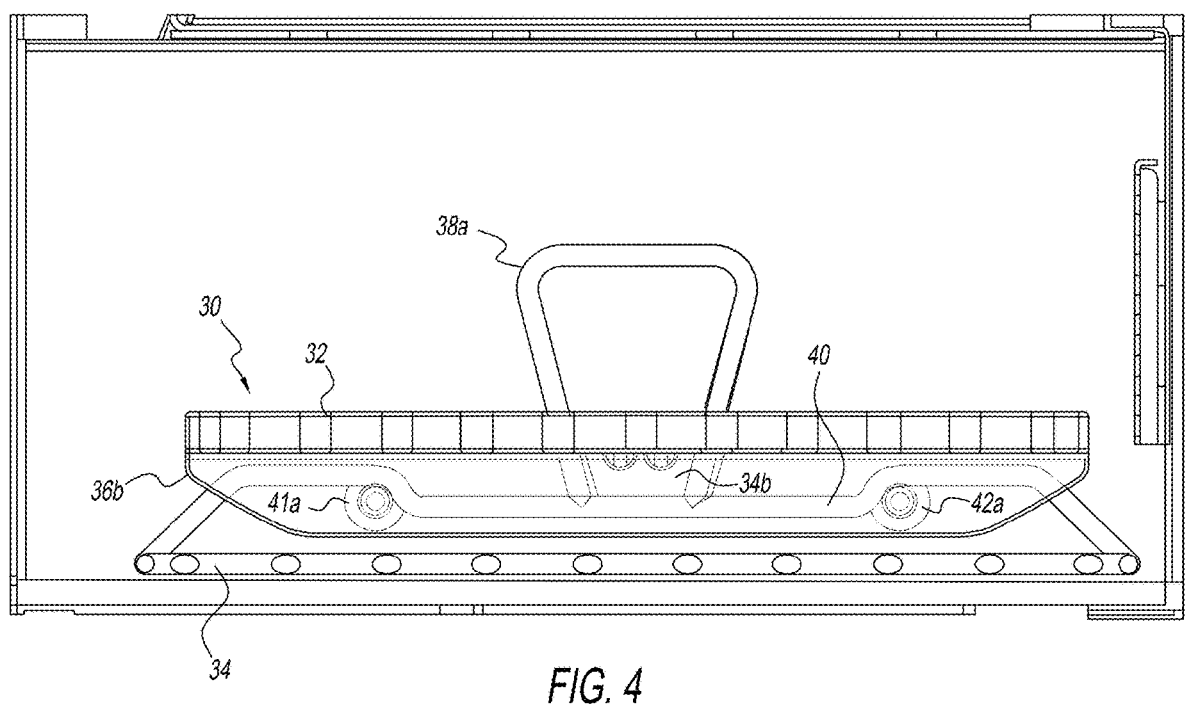
FIG. 4 is a right-side cross-sectional view of the panini device according to FIG. 1d, wherein the downward facing guide rail of upper grill are shown as translucent, and the grill bars are positioned diagonally within the oven.

FIG. 4 is a right-side cross-sectional view of panini device 30 according to FIG. 1d, wherein the oppositely disposed downward facing guide rail 36b is shown as translucent while panini press 30 is in the closed or collapsed position. The oppositely disposed alignment surfaces 38b is shown with guide rail 39b disposed therein. As shown herein, side rail 40 is disposed perpendicular to the base of lower grill 34 and is removably disposed on oven mounting stubs 41a, 42a which are secured to the oven (not shown) side wall.

Figure 5A:
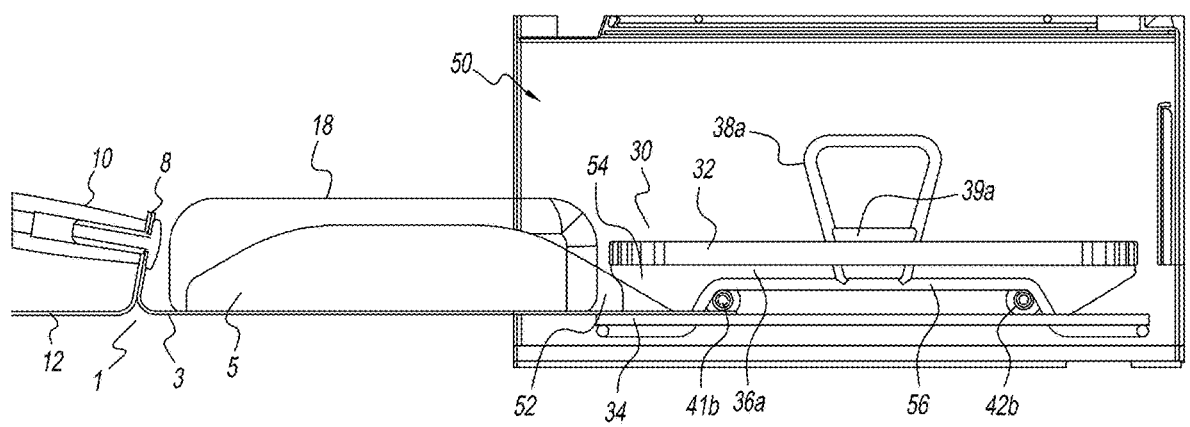

FIGS. 5a and b are a right-side cross-section view and right-side cross-sectional view, respectively, of panini paddle 1 with food product 5 disposed thereon and being inserted into an oven chamber 50 containing two-sided panini press 30 in the collapsed or closed position. FIG. 5a shows tapered front portion 52 of lift or rail guide 5 wedging under the oppositely tapered end portion 54 of rail guide 36a. FIG. 5a, also shows oppositely disposed alignment surface 38a is shown with guide rail 39a disposed therein. As shown herein, side rail 56 disposed parallel to the base of lower grill 34 is removably disposed on oven mounting stubs 41b, 42b which are secured to the oven (not shown) side wall.

Figure 5B:
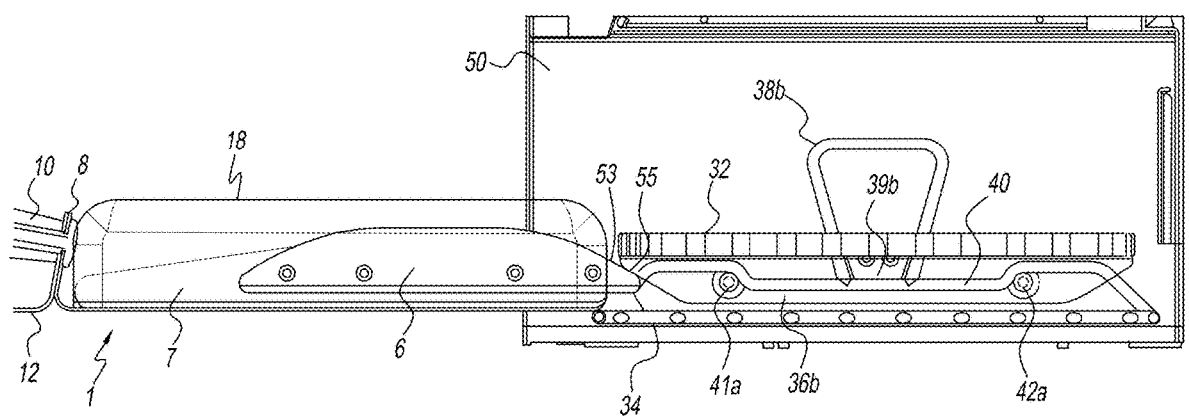

Similarly, FIG. 5b shows tapered front portion 53 of lift or rail guide 6 wedging under the oppositely tapered end portion 55 of rail guide 36b.

FIGS. 6a-d show how tapered front portions 52, 53 of lift or rail guides 5, 6, respectively, lift upper grill 32 at an angle front to back as lift or rail guides 5, 6 traverse along rail guides 36a, 36b, respectively, to insert food product 18 further into the space between upper grill 32 and lower grill 34. It is noteworthy to see that as food product 18 move further between upper grill 32 and lower grill 34, alignment device 39a rises along with upper grill 32 within alignment surfaces 38a.

Figure 6A:
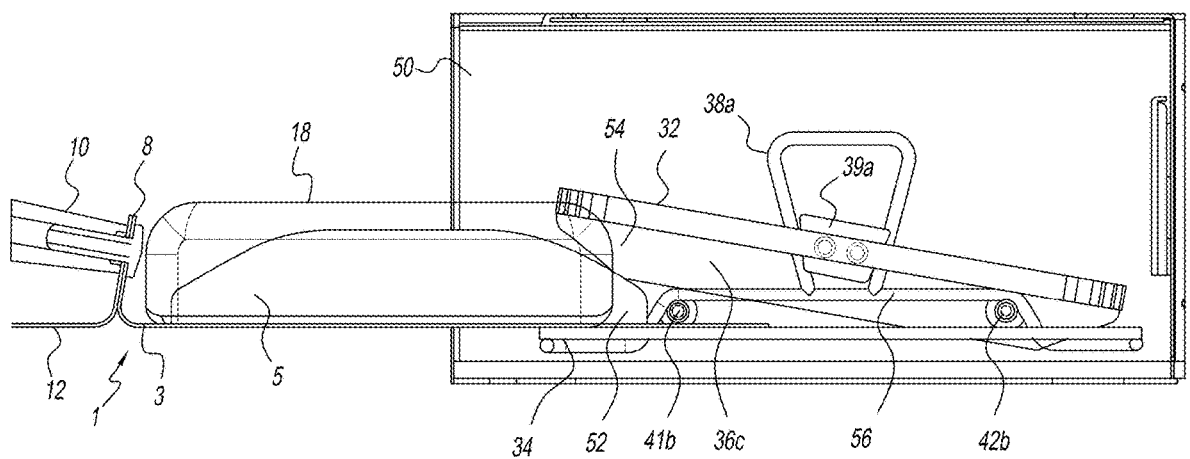
FIGS. 6a and d are right side cross-sectional views of the panini paddle lifting the upper grill showing the grill bars running front-to-back within the oven.
Figure 6B:
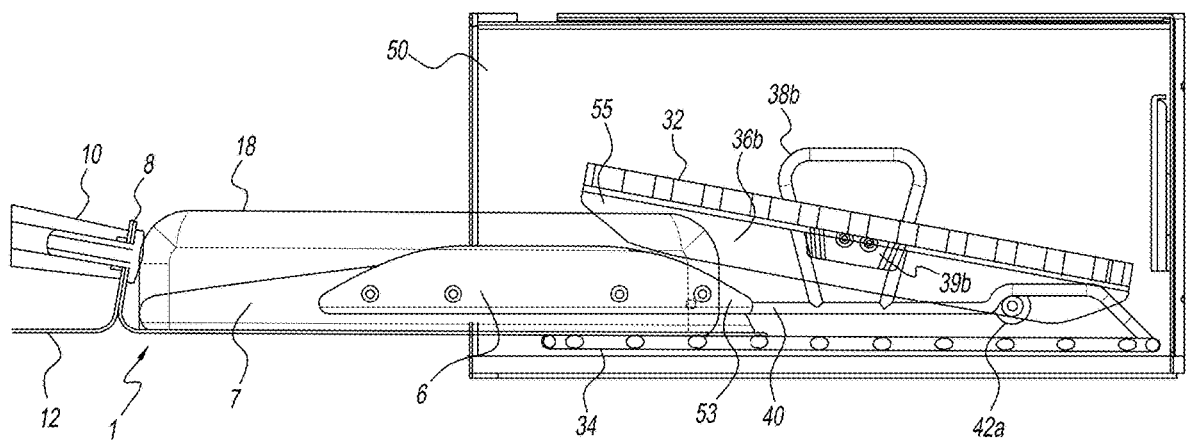
FIGS. 6b-c are right side cross-sectional view of the panini paddle lifting the upper grill showing the grill bars running diagonally within the oven.
Figure 6C:
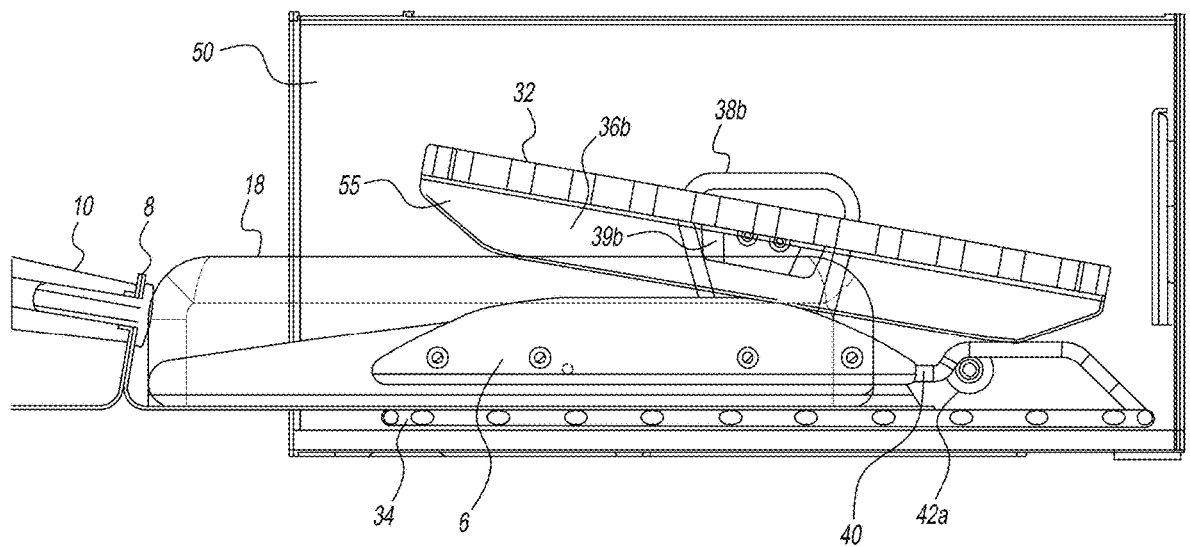
Figure 6D:
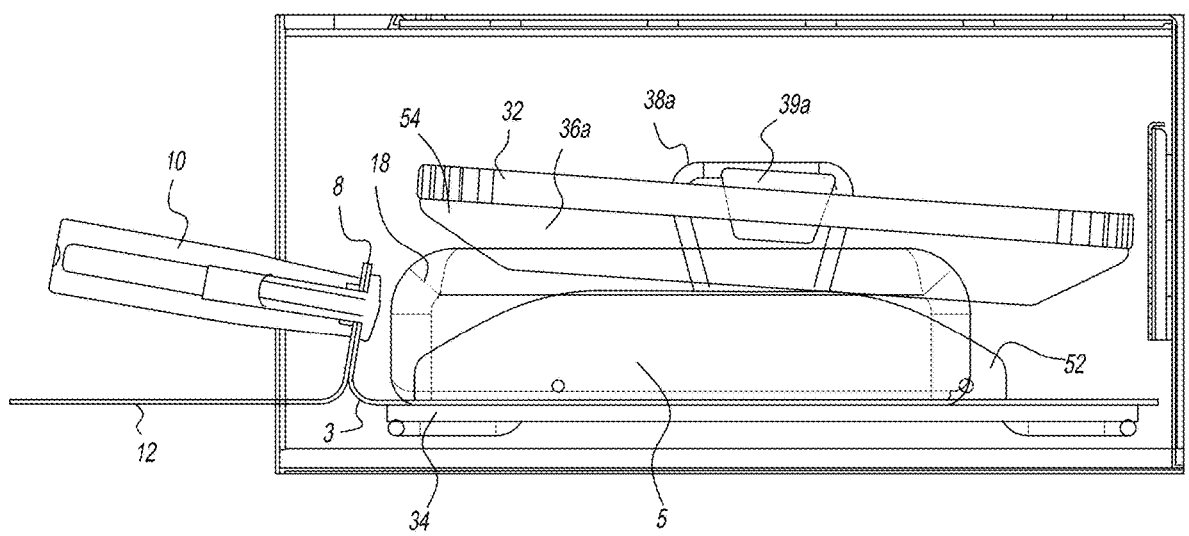
Figure 7:
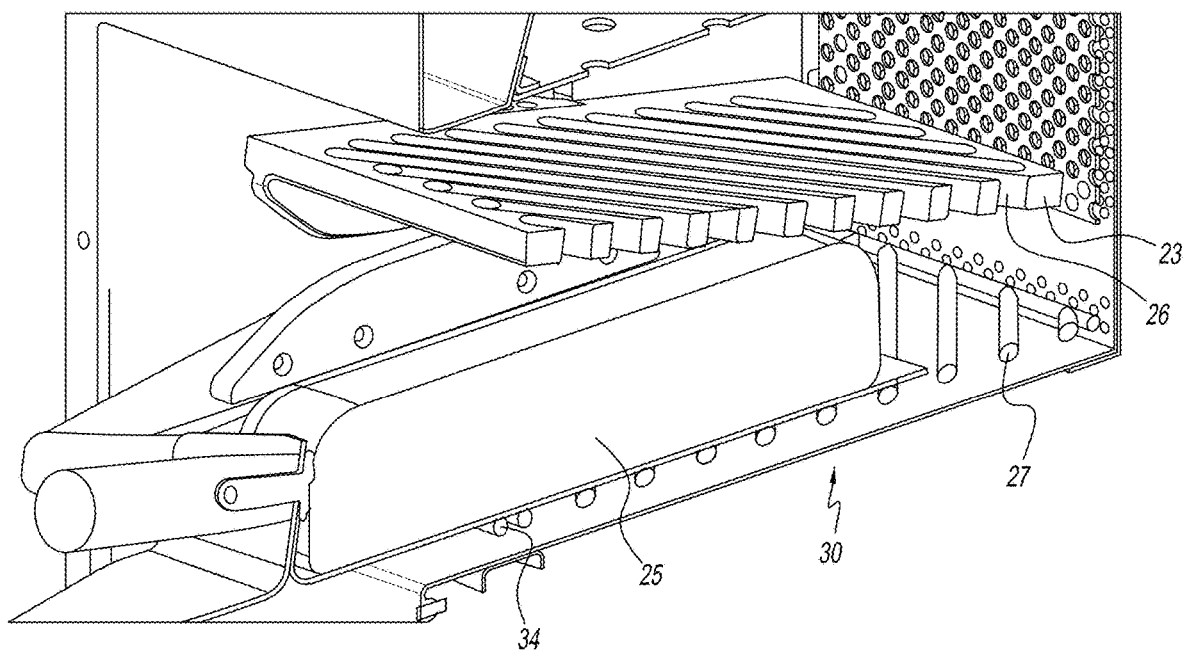
FIG. 7 is a front, right side cross-sectional, perspective view depicting the lifting of the upper grill FIG. 1d above the food product so as not to damage it and the grill bars running diagonally within the oven.

FIGS. 6a and 6d are right side cross-sectional views of the panini paddle lifting the upper grill;

FIGS. 6b-c are right side cross-sectional view of the panini paddle lifting the upper grill;

FIG. 7 is a front, right side cross-sectional, perspective view depicting the lifting of the upper grill before it compresses the food product as shown in FIG. 1d.

Figure 8:
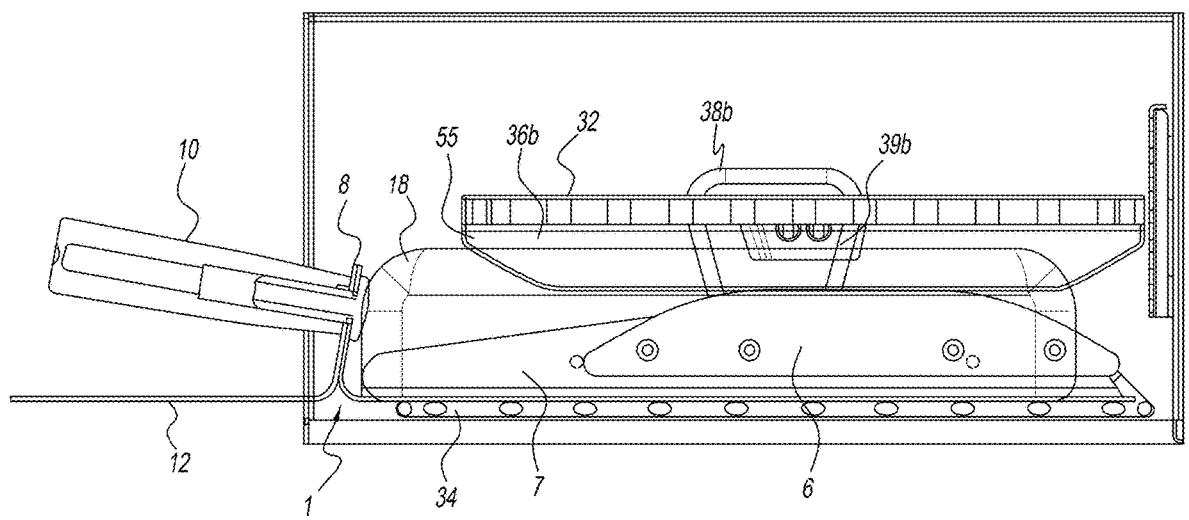
FIG. 8 is a right-side cross-sectional view with the food product positioned under the upper grill prior to removal of the panini paddle and the grill bars running diagonally within the oven.

FIG. 8 is a right-side cross-sectional view with food product 18 positioned under upper grill 32 prior to removal of panini paddle 1.

Figure 9A:
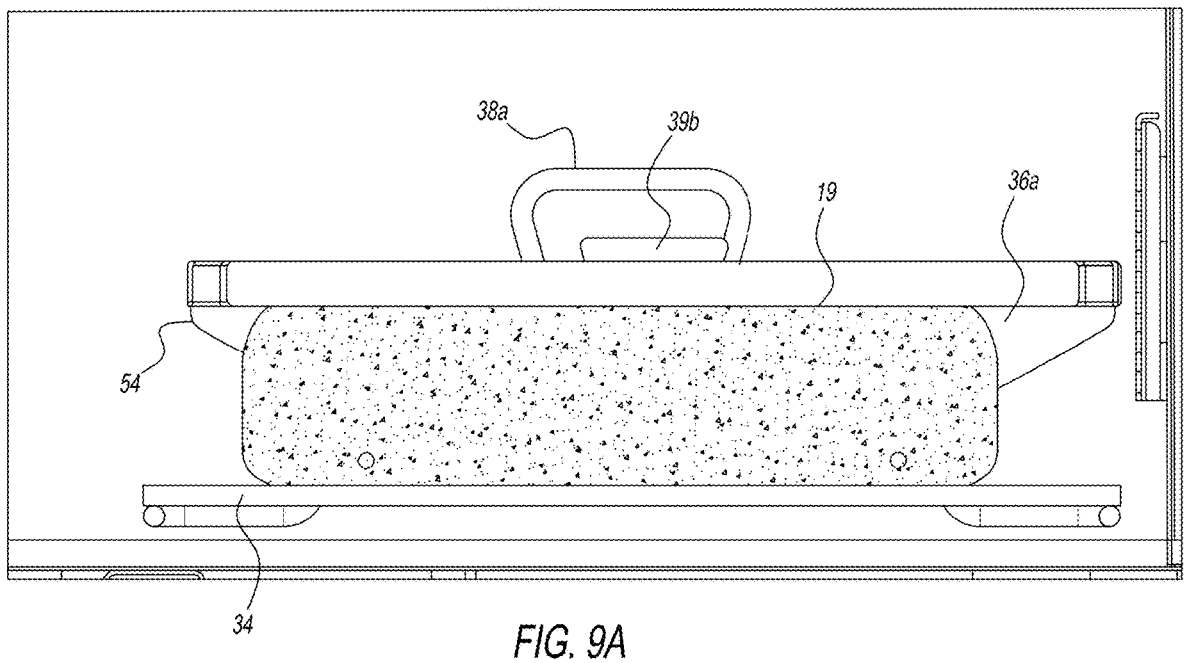
Figure 9B:
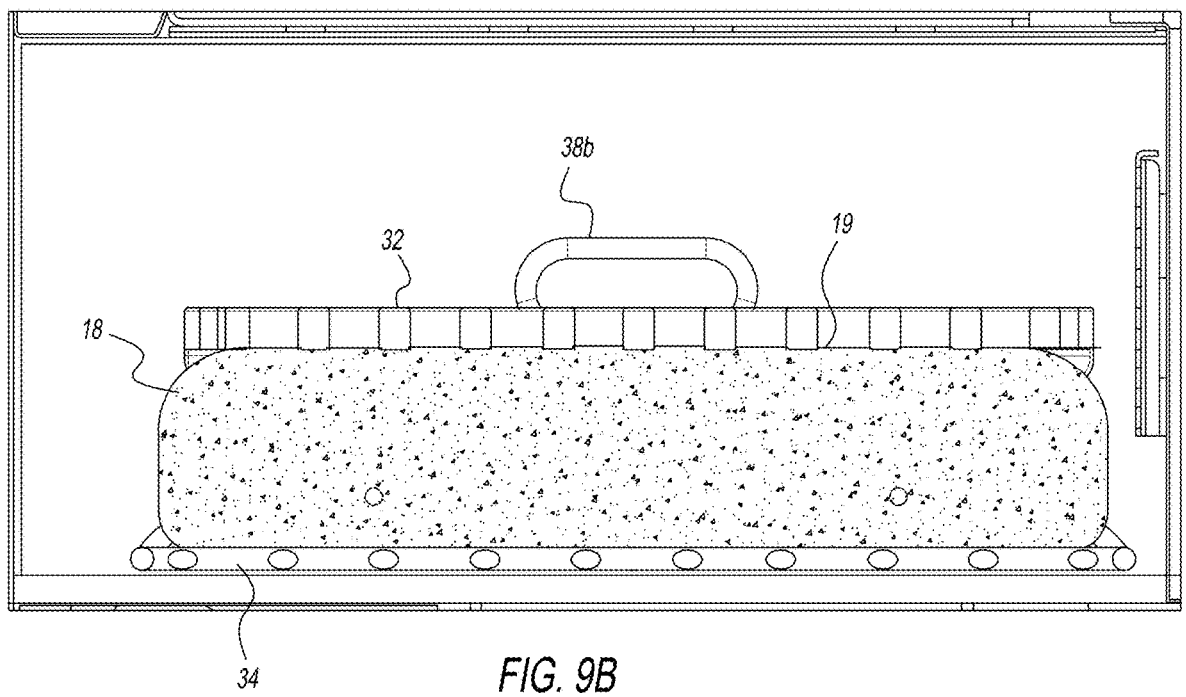

FIGS. 9a-b are right side and right-side cross-section views, respectively, with the panini paddle removed and upper grill 32 in contact with an upper surface 19 of food product 18.

Figure 10A:
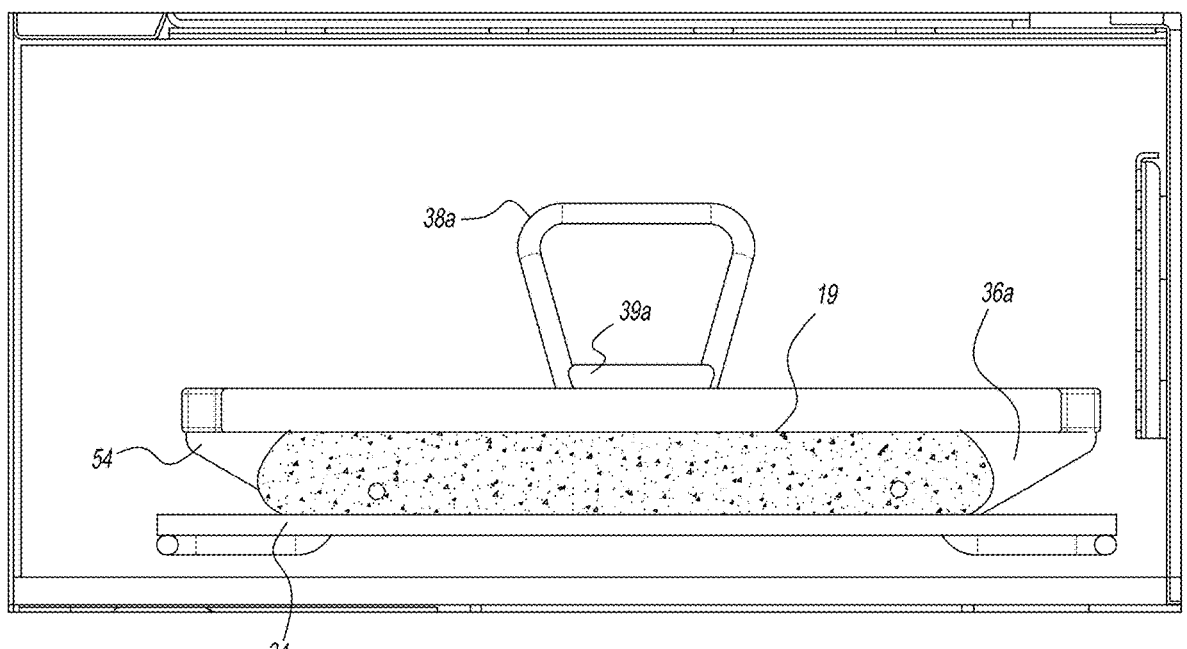
Figure 10B:
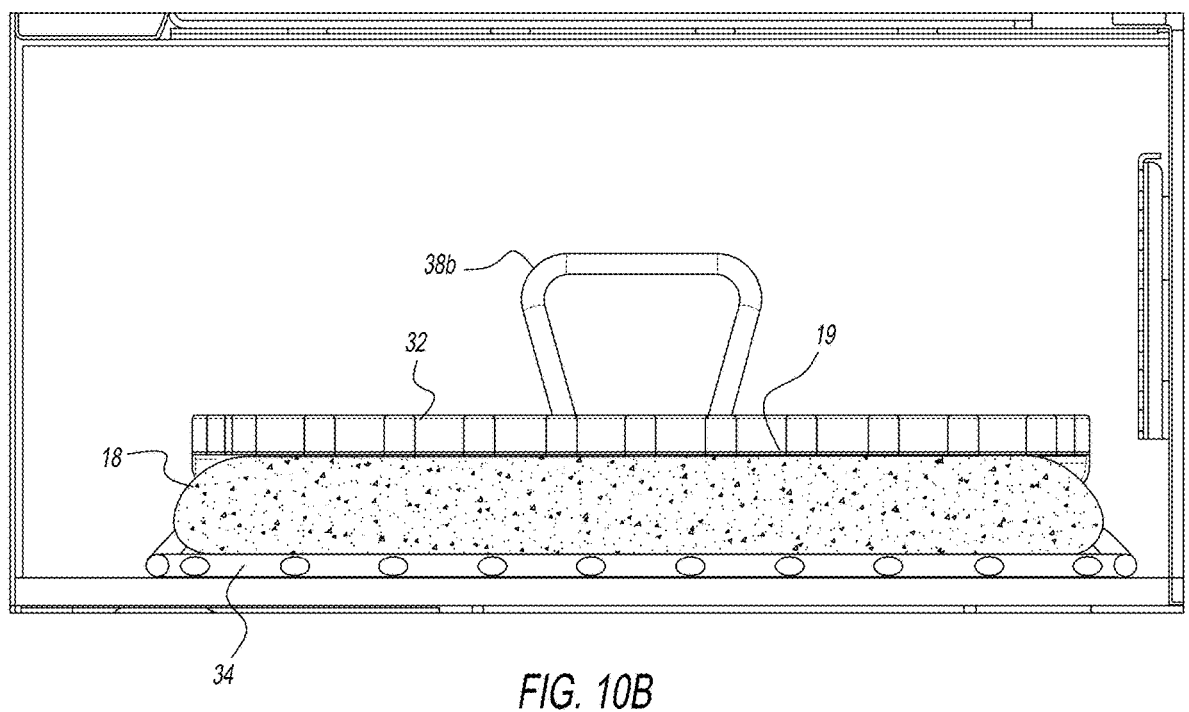

FIGS. 10a-b are right-side and right-side cross-sectional views, respectively, depicting upper grill 32 compressing food product 18 during the grilling process.

Figure 11:
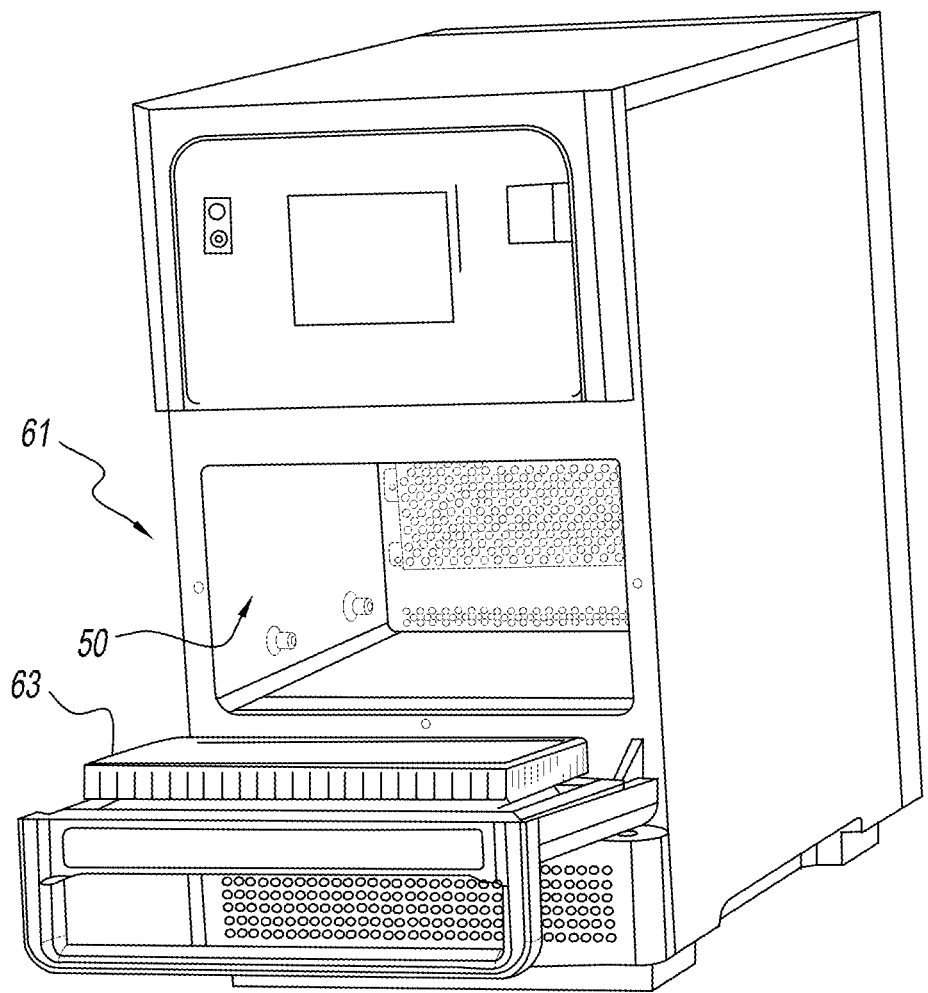
FIG. 11 is top, front view of an oven where the panini press of the present disclosure can be inserted.

FIG. 11 is top, front view of oven 61 where the panini press of the present disclosure can be inserted within oven chamber 50. Once the food product is disposed within the panini press in oven chamber 50, front door 63 is closed to cook the food product.

Referring to FIG. 12, a two-sided grilling apparatus according to another embodiment of the present disclosure is shown and generally referred to by reference numeral 1200 ("device 1200"). Device 1200 is positioned in oven chamber 50. Device 1200 has an upper grill 1202 and a lower grill 1204. During operation of device 1200, a food product 1219 is positioned between upper grill 1202 and a lower grill 1204 for cooking.

Referring to FIGS. 12 and 13, upper grill 1202 has an upper plate 1208 forming angled bars or slots 1226. As shown in FIG. 12, upper grill 1202 has a downwardly disposed guide rail 1214 connected to a first side of upper plate 1208 and a downwardly disposed guide rail 1214 on a second side of upper plate 1208 that is opposite to the first side. Each of downwardly disposed guide rails 1214 have a first slanted surface 1215 that slants away from upper plate 1208 to a first flat surface 1217. Fixedly attached to upper grill 1202 is an alignment device 1239a on the first side of upper plate 1208 and an alignment device 1239b on the second side of upper plate 1208. Alignment device 1239a protrudes outwardly from upper plate 1208 on the first side and alignment device 1239b protrudes outwardly from upper plate 1208 on the second side.

Referring to FIG. 14, lower grill 1204 has a lower plate 1218. Lower plate 1218 has slots 1220. Lower grill 1204 has an alignment surface structure 1238a extending from a first side of lower plate 1218 and an alignment surface structure 1238b extending from a second side of lower plate 1218 that is opposite the first side. Alignment surface structure 1238a has a bottom side 1222 having grooves 1224 that each engage one of oven mounting stubs 41a, 42a of oven chamber 50. Alignment surface structure 1238a has a top side 1226 forming support surface 1228. Support surface 1228 is shaped to mate with alignment device 1239a of upper grill 1202. Similarly, alignment surface structure 1238b has a bottom side 1230 having grooves 1232 that each engage one of oven mounting stubs 41a, 42a of oven chamber 50 that are on an opposite side of oven chamber than those mounting stubs 41a, 42a that engage grooves 1224. Alignment surface structure 1238b has a top side 1234 forming support surface 1236. Support surface 1236 is shaped to mate with alignment device 1239b of upper grill 1202. Support surfaces 1228 and 1236 have side surfaces that taper toward a flat surface. Alignment devices 1239a and 1239b are an upside-down trapezoid shape to be shaped complementary to support surfaces 1228 and 1236.

Figure 16:
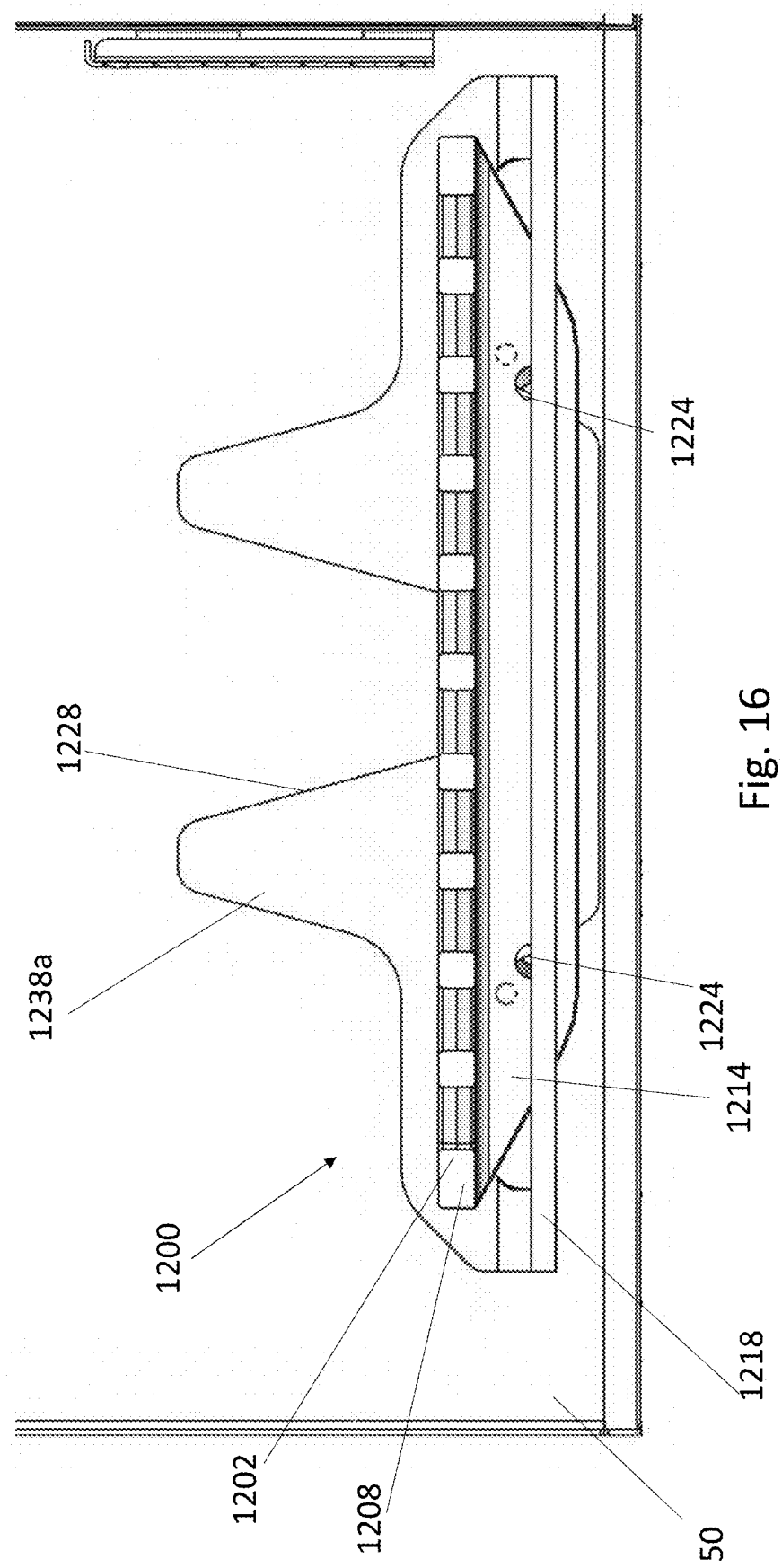
FIG. 16 is a partial right side cross-sectional view of the two-sided grilling apparatus of FIG. 12.

Referring to FIGS. 12, 15 and 16, device 1200 is positioned in oven chamber 50 by inserting one of oven mounting stubs 41a, 42a in one of grooves 1224 of lower grill 1204 and another of mounting stubs 41a, 42a in another of grooves 1224, and, also, inserting one of oven mounting stubs 41a, 42a, which are on the opposite side of oven chamber than those mounting stubs 41a, 42a that engage grooves 1224, in one of grooves 1232 of lower grill 1204 and another of mounting stubs 41a, 42a in another of grooves 1232. Upper grill 1202 is positioned above lower grill 1204 with alignment device 1239a inserted in support surface 1228 and alignment device 1239b inserted in support surface 1236 so that support surfaces 1228 and 1236 guide movement of alignment devices 1239a and 1239b, respectively, to move upper grill 1202 toward and away from lower grill 1204 during operation.

Figure 17:
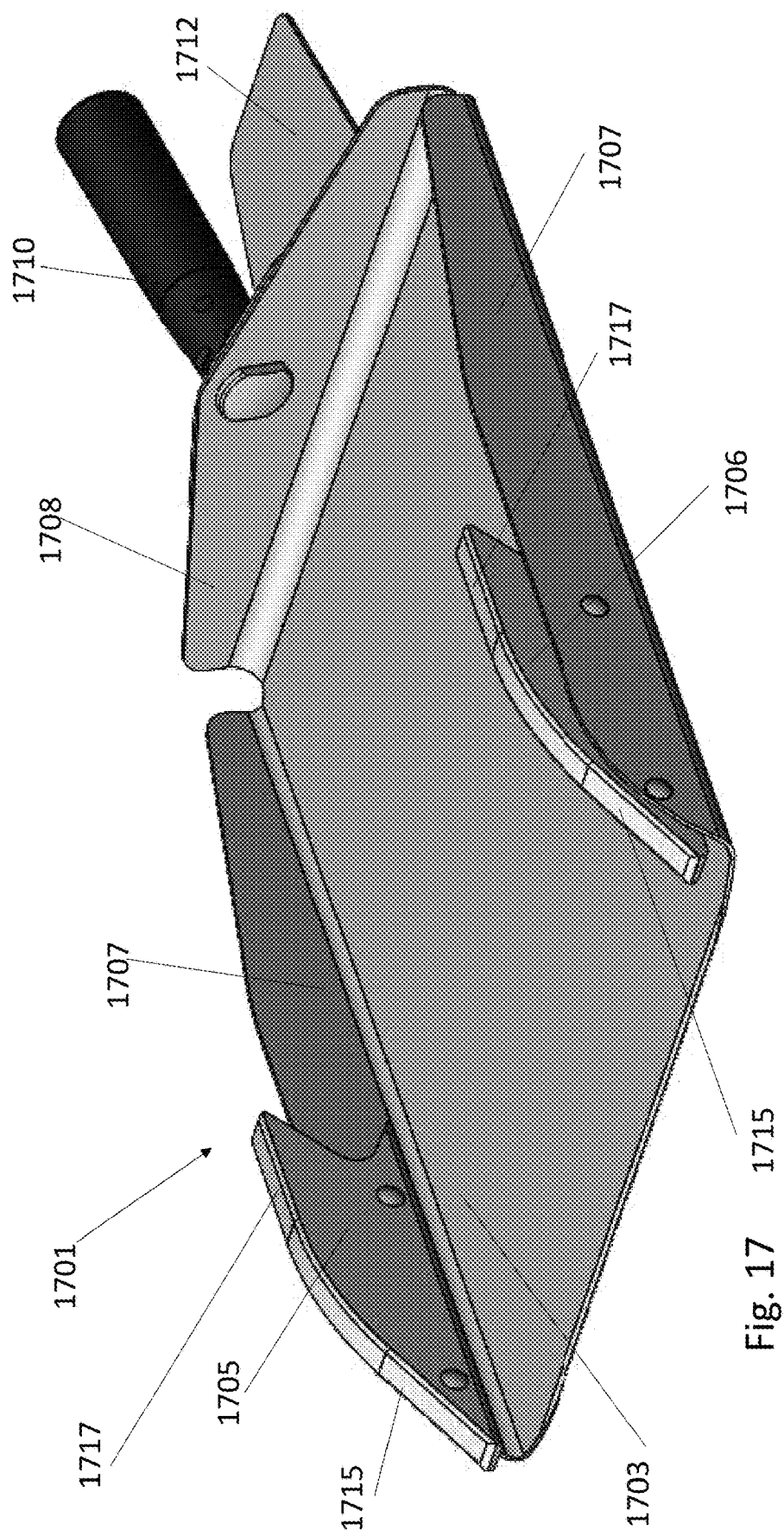
FIG. 17 an enlarged front-right side perspective view of a panini paddle used with the two-sided grilling apparatus of FIG. 12.

Referring to FIG. 17, device 1200 is used with a panini paddle 1701. Panini paddle 1701 is the same as panini paddle 1 except panini paddle 1701 has guide rails 1705, 1706 that are a different shape than guide rails 1705, 1706. In particular, panini paddle 1701 has a base portion 1703 and a pair of oppositely disposed side walls 1707 having guide rails 1705, 1706 positioned perpendicular to base portion 1703. In addition, a rear wall 1708 is positioned upwards from base portion 1703, with a handle 1710 and handle shield 1712 attached thereto. Each of guide rails 1705, 1706 has a second slanted surface 1715 and a second flat surface 1716. Base portion 1703, oppositely disposed side walls 1707 and guide rails 1705, 1706 are sized so that during operation when panini paddle 1701 is brought into contact with device 1200, guide rail 1705 contacts one of downwardly disposed guide rails 1214 on the first side of upper plate 1208 and guide rail 1706 contacts the other of downwardly disposed guide rails 1214 on the second side of upper plate 1208 that is opposite the first side.

Figure 20:
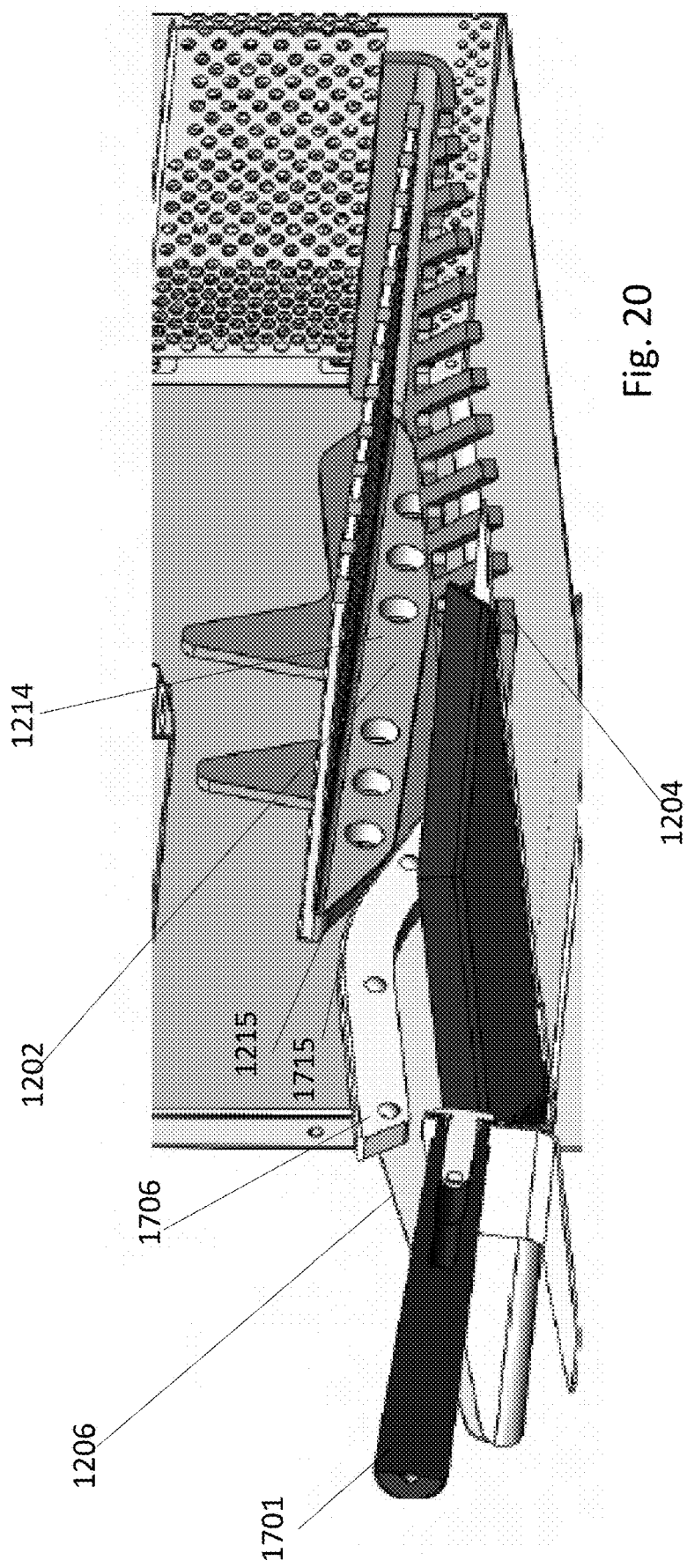
FIG. 20 is a right-side perspective cross-section view of the panini paddle with a food product disposed thereon and being inserted into an oven lifting the upper grill of the panini device according to FIG. 12.

Referring to FIG. 18, during operation, food product 1219 is placed on base portion 1703 of panini paddle 1701. Second slanted surface 1715 of guide rail 1705 is then moved into contact with first slanted surface 1215 of one of downwardly disposed guide rails 1214 on the first side of upper plate 1208 and second slanted surface 1715 of guide rail 1706 is moved into contact with first slanted surface 1215 of the other of downwardly disposed guide rails 1214 on the second side of upper plate 1208 that is opposite the first side. Panini paddle 1701 is then moved in direction A so that second slanted surface 1715 of guide rail 1705 slides along first slanted surface 1215 of the one of downwardly disposed guide rails 1214 on the first side of upper plate 1208 and second slanted surface 1715 of guide rail 1706 slides along first slanted surface 1215 of the other of downwardly disposed guide rails 1214 on the second side of upper plate 1208 that is opposite the first side while alignment device 1239a rises along with upper grill 1202 within alignment surface 1238a contacting support surface 1228 and alignment device 1239b rises along with upper grill 1202 within alignment surface 1238b contacting support surface 1236 to lift upper grill 1202 as shown in FIGS. 19 and 20.

Panini paddle 1701 is then moved further in direction A so that second slanted surface 1715 of guide rail 1705 is then moved into contact with first flat surface 1217 of one of downwardly disposed guide rails 1214 on the first side of upper plate 1208 and second slanted surface 1715 of guide rail 1706 is moved into contact with first flat surface 1217 of the other of downwardly disposed guide rails 1214 on the second side of upper plate 1208 that is opposite the first side as shown in FIG. 21. First flat surface 1217 can be parallel with upper plate 1208. Panini paddle 1701 is then moved in direction A so that second slanted surface 1715 of guide rail 1705 slides along first flat surface 1217 of the one of downwardly disposed guide rails 1214 on the first side of upper plate 1208 while alignment device 1239a rises along with upper grill 1202 within alignment surface 1238a contacting support surface 1228 and second slanted surface 1715 of guide rail 1706 slides along first flat surface 1217 of the other of downwardly disposed guide rails 1214 on the second side of upper plate 1208 that is opposite the first side to lift upper grill 1202 while alignment device 1239b rises along with upper grill 1202 within alignment surface 1238b contacting support surface 1236 to enable panini paddle 1201 to lift upper grill 1202 further as shown in FIG. 21.

Figure 24:
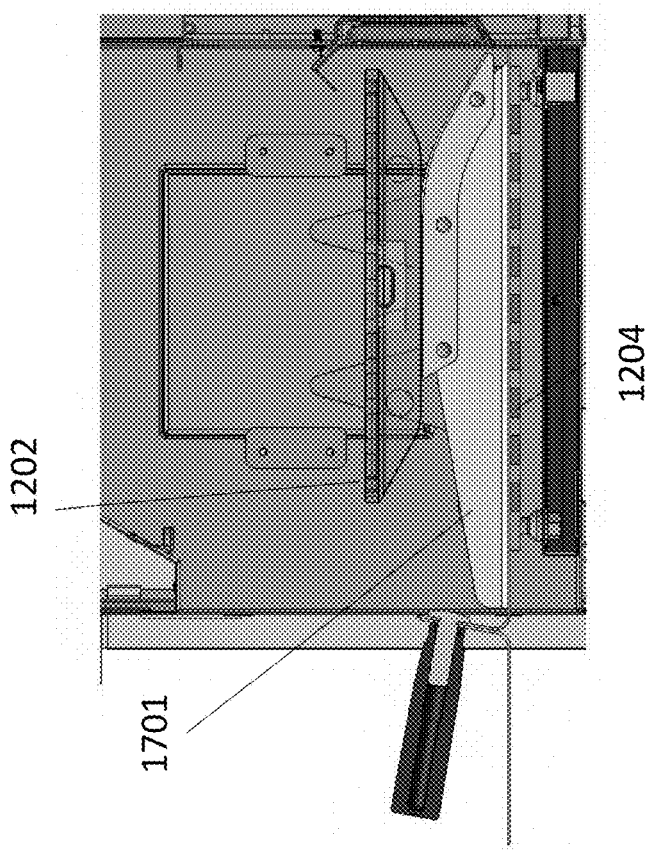
FIG. 24 is a right-side cross-sectional view with the panini paddle positioned under the upper grill prior to removal of the panini paddle with the upper grill shown as transparent.

Panini paddle 1701 is then moved further in direction A so that second flat surface 1716 of guide rail 1705 is then moved into contact with first flat surface 1217 of the one of downwardly disposed guide rails 1214 on the first side of upper plate 1208 and second flat surface 1716 of guide rail 1706 is moved into contact with first flat surface 1217 of the other of downwardly disposed guide rails 1214 on the second side of upper plate 1208 that is opposite the first side. Second flat surface 1716 can be parallel with base portion 1703. Panini paddle 1701 is then moved even further in direction A so that second flat surface 1716 of guide rail 1705 slides along first flat surface 1217 of the one of downwardly disposed guide rails 1214 on the first side of upper plate 1208 while alignment device 1239a rises along with upper grill 1202 within alignment surface 1238a contacting support surface 1228 and second flat surface 1716 of guide rail 1706 slides along first flat surface 1217 of the other of downwardly disposed guide rails 1214 on the second side of upper plate 1208 that is opposite the first side while alignment device 1239b rises along with upper grill 1202 within alignment surface 1238b contacting support surface 1228 to further lift upper grill 1202 as shown in FIGS. 22-24 so that food product 1219 disposed on base portion 1203 may be slid between upper grill 1202 and lower grill 1204.

Figure 25:
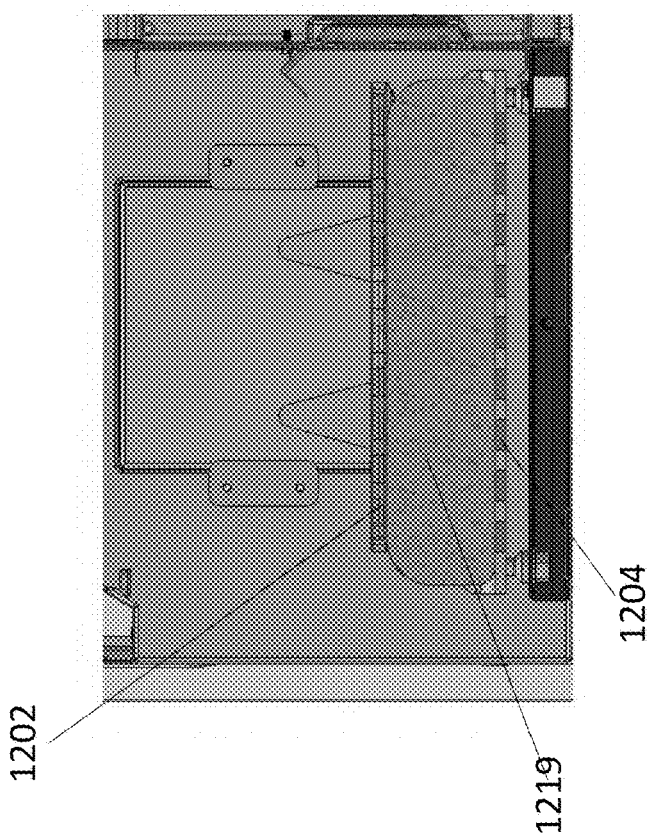
Figure 27:
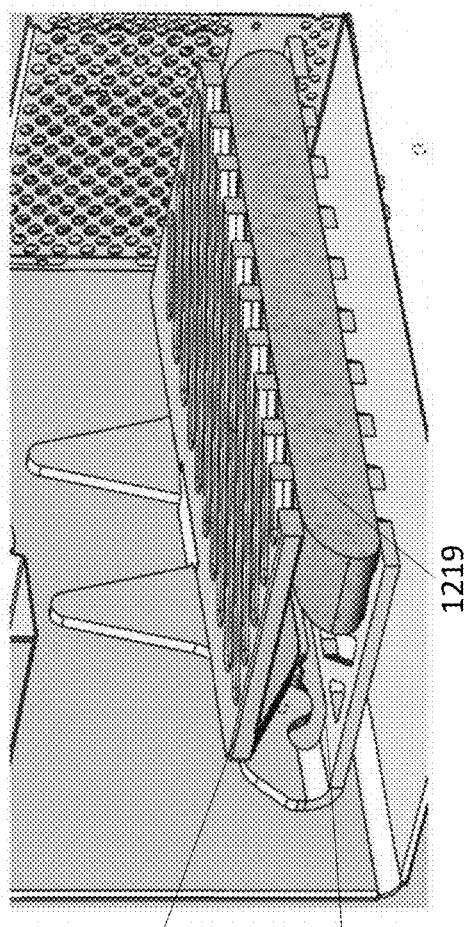
FIG. 27 is right side perspective cross-section view of FIG. 26.
Figure 26:
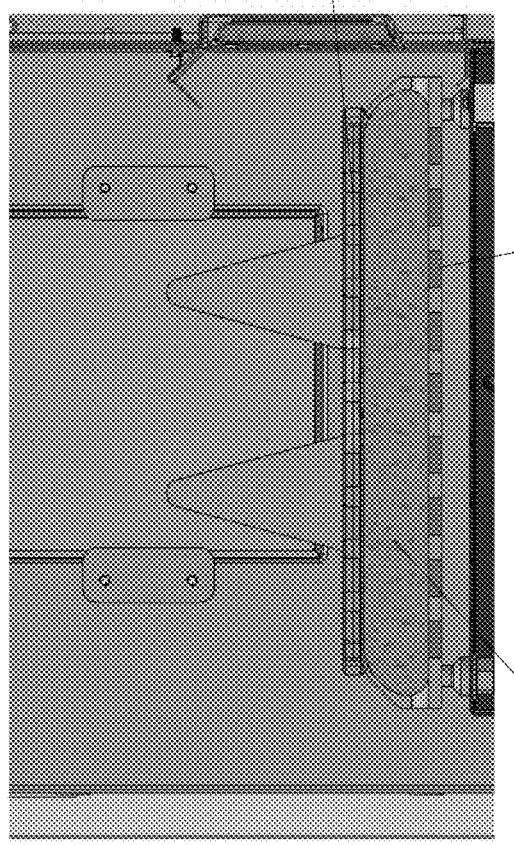

Panini paddle 1201 can then be removed from oven chamber 50 by moving panini paddle 1201 in a direction B that is opposite direction A so that second flat surface 1716 of guide rail 1705 slides along first flat surface 1217 of the one of downwardly disposed guide rails 1214 on the first side of upper plate 1208 while alignment device 1239a lowers along with upper grill 1202 within alignment surface 1238a contacting support surface 1228 and second flat surface 1716 of guide rail 1706 slides along first flat surface 1217 of the other of downwardly disposed guide rails 1214 on the second side of upper plate 1208 that is opposite the first side while alignment device 1239b lowers along with upper grill 1202 within alignment surface 1238b contacting support surface 1228 to lower onto food product 1219. Panini paddle 1701 is then moved even further in direction B so that second slanted surface 1715 of guide rail 1705 is then moved into contact with first flat surface 1217 of one of downwardly disposed guide rails 1214 on the first side of upper plate 1208 and second slanted surface 1715 of guide rail 1706 is moved into contact with first flat surface 1217 of the other of downwardly disposed guide rails 1214 on the second side of upper plate 1208 that is opposite the first side. Panini paddle 1701 is then moved in direction B so that second slanted surface 1715 of guide rail 1705 slides along first slanted surface 1215 of the one of downwardly disposed guide rails 1214 on the first side of upper plate 1208 and second slanted surface 1715 of guide rail 1706 slides along first slanted surface 1215 of the other of downwardly disposed guide rails 1214 on the second side of upper plate 1208 that is opposite the first side while alignment device 1239a lowers along with upper grill 1202 within alignment surface 1238a contacting support surface 1228 and alignment device 1239b lowers along with upper grill 1202 within alignment surfaces 1238 contacting support surface 1236 to lower upper grill 1202 onto food product as shown in FIGS. 25-27 and remove panini paddle 1701 from oven chamber 50. There are a number of techniques that can be used to remove food product 1219 from the panini paddle 1701 into the oven chamber 50, e.g., momentum, oscillation, clamping, and manual as described herein. Once panini paddle 1701 is removed, food product 1219 is in contact with the lower surface of upper grill 1202 and upper surface of lower grill 1204 to be cooked. Food product 1219 may be compressed during cooking as shown in FIGS. 26 and 27.

Device 1200 and panini paddle 1701 have the same benefits as panini paddle 1, upper grill 16 and lower grill 34.

Figure 29:
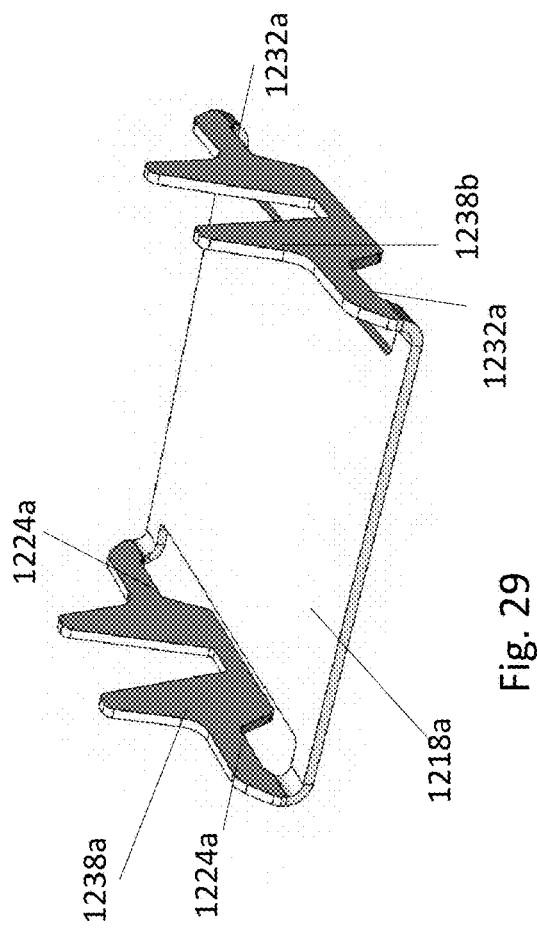
FIGS. 28 and 29 are right side perspective views of lower grills that are modified from the lower grill of FIG. 12.
Figure 28:
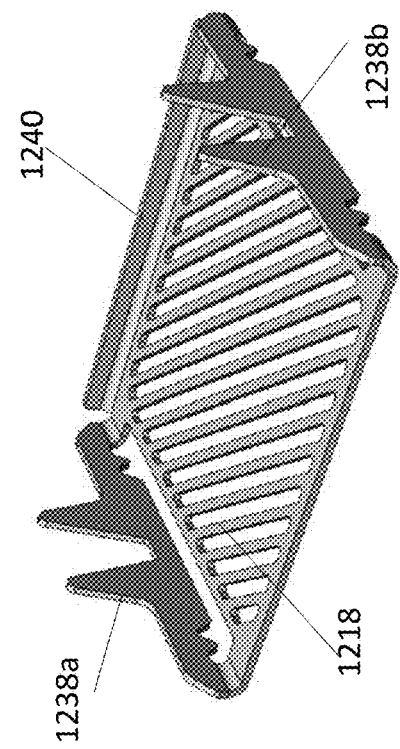

Referring to FIG. 28, lower grill 1204 can be modified to include a back wall 1240. Referring to FIG. 29, lower grill 1204 can be modified to replace lower plate 1218 with a lower plate 1218a that is solid, replace grooves 1224 with depressions 1224a and replace grooves 1232a with depressions 1232a.

Device 1200 can be used with other panini paddles such as panini paddle 3000 shown in FIG. 30 and panini paddle 3100 as shown in FIG. 31. Panini paddles 3000 and 3100 function the same as panini paddle 1701; however, panini paddle 3000 replaces guide rails 1705, 1706 with guide rails 3005, 3006 having a modified shape and panini paddle 3100 is modified to be a one piece structure and includes a modified shaped handle 3111 with a handle front shield 3112.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A grilling apparatus for use in a cooking chamber of an oven, wherein said apparatus comprises:
   a panini press which comprises:
      an upper grill comprising a pair of oppositely disposed downwardly facing first guide rails;
      a lower grill comprising a pair of oppositely disposed upwardly facing guide surfaces;
      wherein said upper grill is reciprocally movable in a substantially vertical direction towards and away from said lower grill by a pair of oppositely disposed alignment devices connected to opposing sides of said upper grill and disposed within a respective pair of upwardly facing guide surfaces connected to lower grill;

a paddle for holding at least one food product, wherein said paddle comprises:
   a base portion, and
   at least one oppositely disposed upward facing second guide rails which align with their respective said first guide rails, such that when said paddle enters said cooking chamber said second guide rails contact their respective said first guide rails which causes said upper grill to move upwardly away from said lower grill, thereby allowing said food product to be disposed between a lower surface of said upper grill and an upper surface of said lower grill;
wherein upon removal of said paddle, said upper grill moves toward said food product and applies sufficient pressure to condense and impress grill marks on said food product during a cooking process.

2. The grilling apparatus of claim 1, wherein said upper and lower grills comprise bars or a slots therein, thereby leaving grill marks on both the upper and lower surfaces of said food product during said cooking process.

3. The grilling apparatus of claim 1, wherein said upper grill comprises bars or slots therein and said lower grill comprises a base portion without any bars or slots, thereby enabling grill marks only on the upper surface of said food product.

4. The grilling apparatus of claim 1, wherein said second guide rails are oblong and tapered at the front portions thereof, and said first guide rails are oblong and tapered at the portions facing said front portions of said second guide rails, thereby allowing the upwardly facing second guide rails from said paddle to wedge underneath said downward facing first guide rails of said upper grill, thereby lifting said upper grill and moving it away from said lower grill.

5. A method for cooking a food product in a cooking chamber of an oven which comprises:
   operating a panini press in said cooking chamber, wherein said panini press comprises:
      an upper grill comprising a pair of oppositely disposed downwardly facing first guide rails;
      a lower grill comprising a pair of oppositely disposed upwardly facing guide surfaces;
      wherein said upper grill is reciprocally movable in a substantially vertical direction towards and away from said lower grill by a pair of oppositely disposed alignment devices connected to opposing sides of said upper grill and disposed within a respective pair of upwardly facing guide surfaces connected to said lower grill;
   delivering at least one food product into said cooking chamber via a paddle which comprises:
      a base portion, and
      a pair of oppositely disposed upward facing second guide rails which align with their respective said first guide rails, such that when said paddle enters said cooking chamber said second guide rails contact their respective said first guide rails which causes said upper grill to move upwardly away from said lower grill, thereby allowing said food product to be disposed between a lower surface of said upper grill and an upper surface of said lower grill; and
   removing said paddle from said cooking chamber, thereby causing said upper grill to move towards said food product, such that the lower surface of said upper grill contacts said food product and applies sufficient pressure to condense and impress grill marks on said food product during a cooking process.

6. The method of claim 5, further comprising removing said food product from said paddle when disposed in said cooking chamber via at least one technique selected from the group consisting of: momentum, oscillation, clamping, and manual.

7. The method of claim 6, wherein removal of said food product from said paddle is accomplished by momentum, and said momentum is provided by inserting said paddle at a speed sufficient to create momentum, such that upon said removing of said paddle from said cooking chamber said food product offloads from said paddle onto said lower grill.

8. The method of claim 6, wherein removal of said food product from said paddle is accomplished by oscillation, and said oscillation is provided by inserting said paddle into said cooking chamber and using a shaking motion to offload said food product onto said lower grill.

9. The method of claim 6, wherein removal of said food product from said paddle is accomplished by clamping between the far ends of said upper and lower grills disposed at the back of said cooking chamber away from an opening of said cooking chamber, and said clamping is provided by inserting said paddle with said food product disposed thereon into said cooking chamber to a certain depth within said cooking chamber such that said food product interferes with the underside surface of an angled end portion of said upper grill causing clamping of the food product between said upper and lower grills.

10. The method of claim 9, wherein removal of said food product from said paddle is accomplished by a slight raising of said paddle on exit, especially when said food product is of smaller height, thereby causing a similar clamping effect.

11. The method of claim 6, wherein removal of said food product from said paddle is accomplished manually, and such manual removal is caused by insertion of said paddle into the oven and as said paddle is retracted from said cooking chamber, a free hand of the user is used to maintain said food product's position and dislodge the contact between said paddle and said food product.

12. The method of claim 11, wherein final removal of said food product from said paddle is accomplished by using said paddle to push said food product into its final position within said cooking chamber.

* * * * *